United States Patent
Barkac et al.

(10) Patent No.: US 6,329,060 B1
(45) Date of Patent: Dec. 11, 2001

(54) SOLVENT-FREE FILM-FORMING COMPOSITIONS FOR CLEARCOATS, COATED SUBSTRATES AND METHOD RELATED THERETO

(75) Inventors: Karen A. Barkac, Murrysville; Dennis Leroy Faler, Pittsburgh; Mary E. Grolemund, Sarver; Debra Lynn Singer, Wexford, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/437,796

(22) Filed: Nov. 10, 1999

(51) Int. Cl.$^7$ ..................................................... B32B 27/08
(52) U.S. Cl. ..................................... 428/423.1; 428/423.3; 428/480; 428/500; 428/515; 524/500; 524/502; 524/514; 524/522; 524/523; 524/525; 524/539
(58) Field of Search ..................................... 428/500, 515, 428/423.1, 423.3, 480; 524/500, 502, 514, 522, 523, 525, 539

(56) References Cited

U.S. PATENT DOCUMENTS

| | | | |
|---|---|---|---|
| 5,071,904 | 12/1991 | Martin et al. | 524/458 |
| 5,379,947 | 1/1995 | Williams et al. | 241/21 |
| 5,910,563 | 6/1999 | Jones et al. | 528/272 |
| 6,180,181 * | 1/2001 | Veradi et al. | 427/409 |

FOREIGN PATENT DOCUMENTS 2203868    4/1997  (CA) .

OTHER PUBLICATIONS

Kreis, Winfried, "Meeting Requirements for Automotive Primer–Surfacer and Clearcoat", Powder Coatings, Dec. 1998, p. 12+.

Dr. W. Kries, Aktueller Status bei der Pulverlackentwicklung fur die Automobilindustrie am Beispiel fuller und Klarlack, presented by at the 1st International Conference of Car–Body Powder Coatings, Berlin, Germany, Jun. 22–23, 1998, reprinted in *Focus on Powder Coatings,* The Royal Society of Chemistry, 2–8, Sep. 1998.

* cited by examiner

*Primary Examiner*—Paul Thibodeau
*Assistant Examiner*—Monique R. Jackson
(74) *Attorney, Agent, or Firm*—Deborah M. Altman; Jacques B. Miles

(57) ABSTRACT

A multi-component composite coating composition is provided which includes a pigmented base coat and a transparent topcoat composition applied over the base coat. The transparent topcoat is deposited from a substantially solvent free film-forming composition which includes a thermosettable dispersion of polymeric microparticles having functionality adapted to react with a crosslinking agent and a hydrophilic crosslinking agent reactive with the functionality of the microparticles. The microparticles are prepared from one or more reaction products of ethylenically unsaturated monomers, one or more hydrophobic polymers and one or more hydrophobic crosslinking agents. Pigmented film-forming compositions as well as curable compositions containing the above-described dispersions also are provided. A method of forming the dispersion of polymeric microparticles is provided. The substantially solvent-free film-forming compositions of the invention are storage stable at room temperature and provide coatings with excellent application properties such as sag resistance and tack-free overspray, and excellent performance properties such as chip resistance and adhesion. The film-forming compositions are suitable for wet-on-wet application over a base coat with little or no mudcracking.

61 Claims, No Drawings

SOLVENT-FREE FILM-FORMING COMPOSITIONS FOR CLEARCOATS, COATED SUBSTRATES AND METHOD RELATED THERETO

FIELD OF THE INVENTION

The present invention relates to multi-component composite coating compositions comprising a pigmented base coat and a transparent topcoat applied over the base coat which is deposited from a substantially solvent-free film-forming composition. The invention also relates to a method for preparing an aqueous dispersion which is a component in the transparent film-forming composition, as well as to substrates coated with such composite coating compositions.

BACKGROUND OF THE INVENTION

Color-plus-clear coating systems involving the application of a colored or pigmented base coat to a substrate followed by application of a transparent or clear topcoat over the base coat have become increasingly popular as original finishes for automobiles. The color-plus-clear systems have outstanding appearance properties such as gloss and distinctness of image, due in large part to the clear coat.

The most economically attractive color-plus-clear systems are those in which the clear coat composition can be applied directly over the uncured colored base coat. The process of applying one layer of a coating before the previous layer is cured, then simultaneously curing both layers, is referred to as a wet-on-wet ("WOW") application. Color-plus-clear coating systems suitable for WOW application provide a substantial energy cost savings advantage.

Over the past decade, there has been an effort to reduce atmospheric pollution caused by volatile solvents which are emitted during the painting process. However, it is often difficult to achieve high quality, smooth coating finishes, particularly clear coating finishes, such as are required in the automotive industry, without including organic solvents which contribute greatly to flow and leveling of a coating. In addition to achieving near-flawless appearance, automotive coatings must be durable and chip resistant, yet economical and easy to apply.

The use of powder coatings to eliminate the emission of volatile solvents during the painting process has become increasingly attractive.

Powder coatings have become quite popular for use in coatings for automotive components, for example, wheels, axle parts, seat frames and the like. Use of powder coatings for clear coats in color-plus-clear systems, however, is somewhat less prevalent for several reasons. First, powder coatings require a different application technology than conventional liquid coating compositions and, thus, require expensive modifications to application lines. Also, the high standard of automotive clear coats is, for the most part, set by polyurethane systems, which are typically cured at temperatures below 140° C. Most powder coating formulations require a much higher curing temperature. Further, many powder coating compositions tend to yellow more readily than conventional liquid clear coating compositions, and powder clear coating compositions generally result in clear coatings having a high cured film thickness, typically ranging from 60 to 70 microns.

U.S. Pat. No. 5,379,947 discloses a process for producing a powder coating composition wherein the powder particle size does not exceed 100 micrometers and at least 50 percent of the powder particles are of a size ranging from 3 to 5 micrometers. The powder coating compositions can include any of a variety of polymeric resins including acrylic, epoxy, amine-modified, phenolic, saturated or unsaturated polyester, urea, urethane and blocked isocyanate resins, or mixtures thereof. After milling, the powder is added to a mixture of water and surfactants, followed by the subsequent addition of dispersants and rheology control agents, thereby forming a powder slurry. The powder slurry coating compositions are useful for both base coat and clear coat applications.

Powder in slurry form for automotive clear coatings can overcome many of the disadvantages of dry powder coatings, however, powder slurry compositions often tend to be unstable and settle upon storage at temperatures above 20° C. Further, WOW application of powder slurry clear coating compositions over conventional base coats can result in mudcracking of the system upon curing. See *Aktueller Status bei der Pulverlackentwicklung fur die Automobilindustrie am Beispiel fuller und Klarlack*, presented by Dr. W. Kries at the 1st International Conference of Car-Body Powder Coatings, Berlin, Germany, June 22–23, 1998, reprinted in *Focus on Powder Coatings*, The Royal Society of Chemistry, 2–8, September 1998.

Generally, any film that contains a volatile component such as water undergoes a decrease in volume as the volatile component evaporates from the surface of the film. As the volatile component leaves the film, contraction forces act to pull the film inward in all directions. However, without intending to be bound by any theory, it is believed that if the film has sufficient cohesive strength, the film will contract in only one dimension, that is, the film thickness will decrease, while the film resists contraction in any direction parallel to the substrate surface. By contrast thereto, if a film lacks sufficient cohesive strength to resist contraction parallel to the substrate surface, contraction forces will cause the film to break up into small flat segments that are separated by continuous linear voids. This surface defect is commonly referred to as "mudcracking".

An aqueous coating that forms a powder upon application at ambient temperature cannot coalesce readily to form a generally continuous film until subjected to thermal cure conditions. The tendency of such coatings to form mudcracks upon curing is believed to be due to lack of sufficient cohesive strength which results from the lack of coalescence of the powder particles prior to thermal curing.

Canadian Patent Application No. 2,203,868 discloses a process for preparing aqueous dispersions which form powder coatings at ambient temperature, which, after curing, provide coatings having improved water and solvent resistance. The dispersions are comprised of a polyol component having a Tg of greater than 30° C. which may be hydrophilically modified, and a blocked isocyanate crosslinker which may be hydrophilically modified. Although applied as conventional waterborne coating compositions, these dispersions form powder coatings at ambient temperature which require a ramped bake prior to undergoing conventional curing conditions in order to effect a coalesced and continuous film on the substrate surface.

U.S. Pat. No. 5,071,904 discloses a waterborne coating composition which comprises a dispersion of polymeric microparticles in an aqueous medium. The microparticles contain a substantially hydrophobic polymer which is essentially free of repeating acrylic or vinyl units in the backbone and is adapted to be chemically bound into the cured coating composition. The disclosed microparticles do not comprise a hydrophobic crosslinker, that is, a crosslinker such as a fully butylated melamine, which is not soluble or dispersible in water. Moreover, the coating compositions, while waterborne, typically contain a substantial amount of organic solvent to provide flow and coalescence to the applied coating.

The automotive industry would derive a significant economic benefit from an essentially solvent-free clear coating composition which meets the stringent automotive appearance and performance requirements, and which can be applied by conventional application means over an uncured pigmented base coating composition (i.e., via WOW application) to form a generally continuous film at ambient temperature which provides a cured film free of mudcracking.

SUMMARY OF THE INVENTION

The present invention provides a multi-component composite coating composition comprising a base coat deposited from a pigmented film-forming composition and a transparent topcoat applied over the base coat in which the transparent topcoat is deposited from a substantially solvent-free film-forming composition which is capable of forming a generally continuous film at ambient temperature. The topcoat film-forming composition comprises at least one thermosettable aqueous dispersion comprising polymeric microparticles which are formed in a medium substantially free of organic solvent from a mixture of (1) at least one reaction product of polymerizable, ethylenically unsaturated monomers; (2) at least one hydrophobic polymer which is different from (1); and (3) at least one hydrophobic crosslinking agent containing reactive functional groups, wherein the reaction product (1) and/or the hydrophobic polymer (2) have functional groups adapted to react with the functional groups of the hydrophobic crosslinking agent (3). In a preferred embodiment, the topcoat film-forming composition further comprises at least one hydrophilic crosslinking agent reactive with the functionality of the microparticles. Also provided are pigmented film-forming compositions. Aqueous dispersions comprising polymeric microparticles formed in a medium substantially free of organic solvent, a process for preparing the same, and coated substrates are also provided.

Other than in the operating examples, or where otherwise indicated, all numbers expressing quantities of ingredients, reaction conditions, and so forth used i n the specification and claims are to be understood as being modified in all instances by the term "about". Also, as used herein, the term "polymer" is mean t to refer to oligomers and both homopolymers and copolymers.

DETAILED DESCRIPTION OF THE PREFERRED EMBODIMENTS

The multi-component composite coating composition of the present invention comprises a base coat deposited from a pigmented film-forming composition and a transparent topcoat applied over the base coat. The transparent topcoat is deposited from a substantially solvent-free film-forming composition. By "substantially solvent-free" is meant that the amount of organic solvent present in the composition is less than 10 weight percent, preferably less than 5 weight percent, and more preferably less than 2 weight percent based on total weight of the film-forming composition to provide low volatile organic emissions during application. It should be understood, however, that a small amount of organic solvent can be present in the composition, for example to improve flow and leveling of the applied coating or to decrease viscosity as needed.

The topcoat film-forming composition forms a generally continuous film at ambient conditions (approximately 23°–28° C. at 1 atmosphere pressure). A "generally continuous film" is formed upon coalescence of the applied coating composition to form a uniform coating upon the surface to be coated. By "coalescence" is meant the tendency of individual particles or droplets of the coating composition, such as would result upon atomization of a liquid coating when spray applied, to flow together thereby forming a continuous film upon the substrate which is substantially free from voids or areas of exposed substrate between the coating particles.

The topcoat film-forming composition comprises at least one thermosettable aqueous dispersion comprising polymeric microparticles which are formed in a medium substantially free of organic solvent and, preferably, at least one hydrophilic crosslinking agent reactive with the functionality of the microparticles.

As used herein, the term "dispersion" means that the microparticles are capable of being distributed throughout water as finely divided particles, such as a latex. See *Hawley's Condensed Chemical Dictionary*, (12th Ed. 1993) at page 435, which is hereby incorporated by reference. The uniformity of the dispersion can be increased by the addition of wetting, dispersing or emulsifying agents (surfactants), which are discussed below.

The microparticles comprise the reaction product of (1) at least one reaction product of polymerizable ethylenically unsaturated monomers, which preferably contains at least one acid functional group; (2) at least one functional group-containing hydrophobic polymer different from (1); and (3) at least one hydrophobic crosslinking agent containing functional groups reactive with the functional groups of (1) and/or (2).

The microparticles comprise, as component (1), at least one acid functional reaction product of ethylenically unsaturated monomers. As used herein, the phrase "acid functional" means that the reaction product (1) can give up a proton to a base in a chemical reaction; a substance that is capable of reacting with a base to form a salt; or a compound that produces hydronium ions, $H_3O^+$, in aqueous solution. See Hawley's at page 15 and K. Whitten et al., *General Chemistry*, (1981) at page 192, which are hereby incorporated by reference.

The reaction product (1) can be formed by polymerizing one or more ethylenically unsaturated carboxylic acid functional group-containing monomers and one or more other ethylenically unsaturated monomers free of carboxylic acid functional groups. Preferably, at least one of the other ethylenically unsaturated monomers free of carboxylic acid functional groups contains reactive functional groups, for example hydroxyl and/or carbamate functional groups.

Non-limiting examples of useful ethylenically unsaturated carboxylic acid functional group-containing monomers include (meth)acrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. As used herein and in the claims by "(meth)acrylic" and like terms is intended to include both acrylic and methacrylic and mixtures of acrylic and methacrylic. Preferred ethylenically unsaturated carboxylic acid monomers are (meth)acrylic acids.

Non-limiting examples of useful other ethylenically unsaturated monomers free of carboxylic acid functional groups include vinyl monomers such as alkyl esters of acrylic and methacrylic acids, for example, ethyl (meth) acrylate, methyl (meth)acrylate, butyl (meth)acrylate, 2-ethylhexyl (meth)acrylate, 2-hydroxyethyl (meth)acrylate, hydroxypropyl methacrylate, ethylene glycol dimethacrylate, isobornyl methacrylate and lauryl methacrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

Other useful ethylenically unsaturated monomers free of carboxylic acid functional groups include ethylenically unsaturated, beta-hydroxy ester functional monomers, such as those derived from the reaction of an ethylenically unsaturated acid functional monomer, such as a monocarboxylic acid, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those which are commercially available from Shell Chemical Company under the tradename CARDURA E and from Exxon Chemical Company under the tradename GLYDEXX-10.

Alternatively, the beta-hydroxy ester functional monomers are prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Acrylic monomers such as butyl acrylate, lauryl methacrylate, or 2-ethylhexyl acrylate are preferred due to the hydrophobic nature and low glass transition temperature ($T_g$) of the polymers that they produce.

Preferably, the reaction product (1) comprises the reaction product of one or more ethylenically unsaturated carboxylic acid functional group-containing monomers selected from the group consisting of acrylic acid, and methacrylic acid; and one or more other ethylenically unsaturated monomers free of carboxylic acid functional groups selected from the group consisting of styrene, butyl acrylate, and hydroxypropyl methacrylate. In a preferred embodiment of the invention, the reaction product (1) comprises the reaction product of acrylic acid and hydroxypropyl methacrylate.

The reaction product (1) can be formed by free radical-initiated polymerization, preferably in the presence of the hydrophobic polymer (2), which is discussed in detail below. Alternatively, the reaction product (1) can be polymerized and then dispersed as a mixture with the hydrophobic polymer (2) and/or the hydrophobic crosslinking agent (3) in an aqueous medium by conventional dispersion techniques which are well known to those skilled in the art.

Suitable methods for homo- and co-polymerizing ethylenically unsaturated monomers and/or other addition polymerizable monomers and preformed polymers are well known to those skilled in the art of polymers and further discussion thereof is not believed to be necessary in view of the present disclosure. For example, polymerization of the ethylenically unsaturated monomers can be carried out in bulk, in aqueous or organic solvent solution such as benzene or n-hexane, in emulsion, or in aqueous dispersion. *Kirk-Othmer Encyclopedia of Chemical Technology*, Vol. 1 (1963) at page 305. The polymerization can be effected by means of a suitable initiator system, including free radical initiators such as benzoyl peroxide or azobisisobutyronitrile, anionic initiation and organometallic initiation. Molecular weight can be controlled by choice of solvent or polymerization medium, concentration of initiator or monomer, temperature, and the use of chain transfer agents. If additional information is needed, such polymerization methods are disclosed in *Kirk-Othmer*, Vol.1 at pages 203–205, 259–297 and 305–307, which are hereby incorporated by reference.

The number average molecular weight of the reaction product (1) can range from about 10,000 to about 10,000,000, and preferably about 50,000 to about 500,000. Unless indicated otherwise, molecular weights, as used herein and in the claims, are expressed as number average molecular weights as determined by gel permeation chromatography using a polystyrene standard.

The glass transition temperature of the reaction product (1) can range from about −50° C. to about +100° C., preferably about 0° C. to about +50° C. as measured using a Differential Scanning Calorimeter (DSC), for example a Perkin Elmer Series 7 Differential Scanning Calorimeter, using a temperature range of about −55° C. to about 150° C. and a scanning rate of about 20° C. per minute.

The amount of the reaction product (1) present in the thermosettable dispersion typically ranges from at least 10 to at least 20 weight percent, preferably from at least 20 to at least 30 weight percent, and more preferably from at least 30 to at least 40 weight percent based on total resin solids weight of the thermosettable dispersion. The amount of the reaction product (1) present in the thermosettable dispersion typically ranges from less than 90 to less than 80 weight percent, preferably less than 80 to less than 70, and more preferably less than 70 to less than 60 weight percent based on total resin solids weight of the thermosettable dispersion. The amount of the reaction product (1) present in the thermosettable dispersion can range between any combination of these values inclusive of the recited ranges.

The microparticles also comprise one or more hydrophobic polymers different from reaction product (1). The term "hydrophobic", as used herein, means that the polymer essentially is not compatible with, does not have an affinity for and/or is not capable of dissolving in water. That is, upon mixing a sample of polymer with an organic component and water, a majority of the polymer is in the organic phase and a separate aqueous phase is observed. See *Hawley's Condensed Chemical Dictionary*, (12th Ed. 1993) at page 618. In order for the hydrophobic polymer to be substantially hydrophobic, the hydrophobic polymer must not contain enough acid or ionic functionality to allow it to form stable dispersions in water. The amount of acid functionality in a resin can be measured by acid value, the number of milligrams of KOH per gram of solid required to neutralize the acid functionality in the resin. Preferably, the acid value of the hydrophobic polymer is below about 20, more preferably the acid value is below about 10, and most preferably below about 5. Hydrophobic polymers having low acid values can be considered to be water-dispersible if they contain other hydrophilic components such as hydroxyl groups or poly (ethylene oxide) groups. However, it should be understood that for purposes of the present invention, such polymers are not considered to be substantially hydrophobic if they are water-dispersible, no matter what their acid value is.

In a preferred embodiment of the invention, the hydrophobic polymer (2) contains functional groups which are adapted to be reactive with the hydrophobic crosslinker (3) described in detail below, and/or an optional hydrophilic crosslinker which is a film-forming composition component. Preferred functional groups are selected from the group consisting of hydroxyl, carbamate, carboxylic acid, isocyanate and blocked isocyanate, primary amine, secondary amine, amide, urea, urethane, alkoxysilane, vinyl and epoxy groups and mixtures thereof.

The hydrophobic polymer (2) is adapted, as discussed immediately above, to be reactive with the hydrophobic crosslinking agent (3), as well as chemically bound into the composite coating when it is cured, i.e., the hydrophobic polymer is residually reactive in the sense that it contains residual functional groups (which remain present after the hydrophobic polymer is reacted with the hydrophobic crosslinking agent (3)) capable of reacting with other components of the film-forming composition. These residual functional groups are capable of reacting, for example, with a hydrophilic crosslinking agent which can be present in the film-forming composition, or, alternatively, with other film-forming resins which also can be present.

Preferably, the hydrophobic polymer has a number average molecular weight greater than 500, more preferably greater than 800. Typically the molecular weight ranges from about 800 to about 10,000, more usually from about 800 to about 3000. The glass transition temperature of the hydrophobic polymer can range from about −50° C. to about +50° C., and preferably about −250° C. to about +25° C.

Non-limiting examples of useful hydrophobic polymers include acrylics, polyesters, alkyds, polyurethanes, polyethers, polyureas, polyamides, polycarbonates and mixtures thereof. The hydrophobic polymer is preferably essentially linear, i.e., it contains a minimal amount of branching, to provide flexibility to the cured coating. Also, the functional group-containing hydrophobic polymer preferably is essentially free of repeating acrylic or vinyl units, i.e., the polymer is not prepared from typical free radically polymerizable monomers such as acrylates, styrene and the like.

Suitable polyester resins are derived from polyfunctional acids and polyhydric alcohols. Generally, polyester resins contain essentially no oil or fatty acid modification. That is, while alkyd resins are in the broadest sense polyester type resins, they are oil-modified and thus not generally referred to as polyester resins. Commonly used polyhydric alcohols include 1,4-butanediol, 1,6-hexanediol, neopentyl glycol, ethylene glycol, propylene glycol, diethylene glycol, dipropylene glycol, butylene glycol, glycerol, trimethylolpropane, pentaerythritol and sorbitol. A saturated acid often will be included in the reaction to provide desirable properties. Examples of saturated acids include phthalic acid, isophthalic acid, adipic acid, azelaic acid, sebacic acid and the anhydrides thereof. Useful saturated polyesters are derived from saturated or aromatic polyfunctional acids, preferably dicarboxylic acids, and mixtures of polyhydric alcohols having an average hydroxyl functionality of at least 2. Mixtures of rigid and flexible diacids are preferable in order to achieve a balance of hardness and flexibility. Monocarboxylic acids such as benzoic acid can be used in addition to polycarboxylic acids in order to improve properties or modify the molecular weight or the viscosity of the polyester. Dicarboxylic acids or anhydrides such as isophthalic acid, phthalic anhydride, adipic acid, and maleic anhydride are preferred. Other useful components of polyesters can include hydroxy acids and lactones such as ricinoleic acids, 12-hydroxystearic acid, caprolactone, butyrolactone and dimethylolpropionic acid.

Polyols having a hydroxyl functionality of two such as neopentylglycol, trimethylpentanediol, or 1,6-hexanediol are preferred. Small amounts of polyols with a functionality greater than two such as pentaerythritol, trimethylolpropane, or glycerol and monofunctional alcohols such as tridecyl alcohol, in addition to diols, can be used to improve properties of the polyester. The ratio of reactants and reaction conditions are selected to result in a polyester polymer with the desired functionality. Hydroxyl functionality is preferred.

Carbamate functional polyesters can be prepared by first forming a hydroxyalkyl carbamate that can be reacted with the polyacids and polyols used to form the polyester. Alternatively, terminal carbamate functional groups can be incorporated into the polyester by reacting isocyanic acid with a hydroxyl functional group-containing polyester. Also, carbamate functionality can be incorporated in the polyester by reacting a hydroxyl functional group-containing polyester with urea. Additionally, carbamate groups can be incorporated into the polyester by a transcarbamoylation reaction. Preparation of suitable carbamate functional group-containing polyesters are described in detail in U.S. Pat. No. 5,593,733 at column 2, line 40 to column 4, line 9, incorporated herein by reference.

Suitable polyurethane resins can be prepared by reacting a polyol with a polyisocyanate. The reaction can be performed with a minor amount of organic polyisocyanate (OH/NCO equivalent ratio greater than 1:1) so that terminal hydroxyl groups are present or alternatively the OH/NCO equivalent ratio can be less than 1:1 thus producing terminal isocyanate groups. Preferably the polyurethane resins have terminal hydroxyl groups.

The organic polyisocyanate can be an aliphatic polyisocyanate, including a cycloaliphatic polyisocyanate, or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis (cyclohexyl isocyanate) and isophorone diisocyanate. Useful aromatic diisocyanates and araliphatic diisocyanates include the various isomers of toluene diisocyanate, meta-xylylene diisocyanate and para-xylylene diisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition the various isomers of α, α, α',α'-tetramethyl xylylene diisocyanate can be used. Also useful as the polyisocyanate are isocyanurates such as DESMODUR 3300 and biurets of isocyanates such as DESMODUR N100, both of which are commercially available from Bayer, Inc. of Pittsburgh, Pa.

The polyol can be polymeric such as polyester polyols, polyether polyols, polyurethane polyols, etc. or it can be a simple diol or triol such as ethylene glycol, propylene glycol, butylene glycol, glycerol, trimethylolpropane or hexanetriol. Mixtures also can be utilized.

Carbamate functional groups can be introduced into the polyurethane polymers by reacting a polyisocyanate with a polyester having hydroxyl functionality and containing pendant carbamate groups, such as those described above. Alternatively, the polyurethane can be prepared by reacting a polyisocyanate with a polyester polyol and a hydroxyalkyl carbamate or isocyanic acid as separate reactants.

The polyester or polyurethane can be adapted so that a portion of it can be grafted onto an acrylic and/or vinyl polymer. That is, the polyester or polyurethane can be chemically bound to an ethylenically unsaturated component that is capable of undergoing free radical copolymerization with acrylic and/or vinyl monomers. One means of making the polyester or polyurethane graftable is by including in its composition an ethylenically unsaturated acid or anhydride such as crotonic acid, maleic anhydride, or methacrylic anhydride. For example, an isocyanate-functional 1:1 adduct of hydroxyethyl methacrylate and isophorone diisocyanate can be reacted with hydroxyl functionality in the polyurethane to make it copolymerizable with acrylic monomers.

Useful alkyd resins include polyesters of polyhydroxyl alcohols and polycarboxylic acids chemically combined with various drying, semi-drying and non-drying oils in different proportions. Thus, for example, the alkyd resins are made from polycarboxylic acids such as phthalic acid, maleic acid, fumaric acid, isophthalic acid, succinic acid, adipic acid, azelaic acid and sebacic acid, as well as from anhydrides of such acids where they exist. The polyhydric alcohols which can be reacted with the polycarboxylic acid include 1,4-butanediol, 1,6-hexanediol, neopentyl glycol, ethylene glycol, diethylene glycol and 2,3-butylene glycol, glycerol, trimethylolpropane, pentaerythritol, sorbitol and mannitol.

The alkyd resins are produced by reacting the polycarboxylic acid and the polyhydric alcohol together with a drying, semi-drying or non-drying oil in proportions depending upon the properties desired. The oils are coupled into the resin molecule by esterification during manufacturing and become an integral part of the polymer. The oil is fully saturated or predominately unsaturated. When cast into films, fully saturated oils tend to give a plasticizing effect to the film, whereas predominately unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well known in the art.

Examples of useful polyethers are polyalkylene ether polyols which include those having the following structural unit formulae:

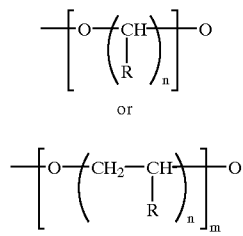

or where the substituent R is hydrogen or lower alkyl containing from 1 to 5 carbon atoms including mixed substituents, n is an integer typically ranging from 2 to 6 and m is an integer ranging from 10 to 100 or even higher. Non-limiting examples of useful polyalkylene ether polyols include poly (oxytetramethylene) glycols, poly(oxy-1,2-propylene) glycols and poly(oxy-1,2-butylene) glycols.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for example, by oxyalkylation of compounds such as sorbitol or sucrose. One commonly utilized oxyalkylation method is by reacting a polyol with an alkylene oxide, for example, ethylene or propylene oxide, in the presence of an acidic or basic catalyst.

With polyether polyols, it is preferred that the carbon to oxygen weight ratio be high for better hydrophobic properties. Thus, it is preferred that the carbon to oxygen ratio be greater than 3:1 and more preferably greater than 4:1.

The hydrophobic polymer of the polymeric microparticles can contain other components included to modify certain of its properties. For example, the hydrophobic polymer can contain urea or amide functionality to improve adhesion. Suitable urea functional hydrophobic polymers include acrylic polymers having pendant urea groups, which can be prepared by copolymerizing acrylic monomers with urea functional vinyl monomers such as urea functional alkyl esters of acrylic acid or methacrylic acid. An example includes the condensation product of acrylic acid or methacrylic acid with a hydroxyalkyl ethylene urea such as hydroxyethyl ethylene urea. Other urea functional monomers include, for example, the reaction product of hydroxyethyl methacrylate, isophorone diisocyanate and hydroxyethyl ethylene urea. Mixed pendant carbamate and urea groups can also be used.

Other useful urea functional hydrophobic polymers include polyesters having pendant urea groups, which can be prepared by reacting a hydroxyl functional urea, such as hydroxyalkyl ethylene urea, with the polyacids and polyols used to form the polyester. A polyester oligomer can be prepared by reacting a polyacid with a hydroxyl functional urea. Also, isocyanate-terminated polyurethane or polyester prepolymers can be reacted with primary amines, aminoalkyl ethylene urea or hydroxyalkyl ethylene urea to yield materials with pendant urea groups. Preparation of these polymers is known in the art and is described in U.S. Pat. No. 3,563,957, which is incorporated by reference herein.

Useful polyamides include acrylic polymers having pendant amide groups. Pendant amide groups can be incorporated into the acrylic polymer by co-polymerizing the acrylic monomers with amide functional monomers such as (meth) acrylamide and N-alkyl (meth)acrylamides including N-t-butyl (meth)acrylamide, N-t-octyl (meth)acrylamide, N-isopropyl (meth)acrylamide, and the like. Alternatively, amide functionality may be incorporated into the polymer by post-reaction, for example, by first preparing an acid functional polymer, such as an acid functional polyester or polyurethane, and then reacting the acid functional polymer with ammonia or an amine using conventional amidation reaction conditions, or, alternatively, by preparing a polymer having pendant ester groups (such as by using alkyl (meth) acrylates) and reacting the polymer with ammonia or a primary amine.

Pendant amide functional groups can be incorporated into a polyester polymer by preparing a carboxylic acid functional polyester and reacting with ammonia or amine using conventional amidation conditions. Preferably, the hydrophobic polymer (2) is a polyester polymer containing hydroxyl and/or carbamate functional groups.

The amount of the hydrophobic polymer (2) present in the thermosettable dispersion generally ranges from at least 10 to at least 20 weight percent, preferably from at least 20 to at least 30 weight percent, and more preferably from at least 30 to at least 40 weight percent based on total resin solids weight of the thermosettable dispersion. The amount of the hydrophobic polymer (2) present in the thermosettable dispersion generally ranges from less than 90 to less than 80 weight percent, preferably less than 80 to less than 70, and more preferably less than 70 to less than 60 weight percent based on total resin solids weight of the thermosettable dispersion. The amount of the hydrophobic polymer (2) present in the thermosettable dispersion can range between any combination of these values inclusive of the recited ranges.

The microparticles contain at least one hydrophobic crosslinking agent (3) which contains functional groups reactive with the functional groups of the reaction product (1) and/or the hydrophobic polymer (2). Selection of hydrophobic crosslinking agents suitable for use in the thermosettable dispersions of the present invention is dependent upon the reactive functional groups associated with components (1) and (2).

Without intending to be bound by theory, it is believed that the presence of the hydrophobic polymer (2) and the hydrophobic crosslinking agent (3) (which otherwise are not water soluble or dispersible) within the microparticles results in a waterborne coating which efficiently releases water from the surface of the coating upon application to a substrate and, therefore, exhibits flow and leveling properties similar to conventional solventborne coatings without running or "sagging" on vertical surfaces.

Suitable hydrophobic crosslinking agents for crosslinking hydroxyl and/or carbamate functional group-containing materials include aminoplast resins. Aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5 triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins preferably contain methylol or other alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol. Preferred aminoplast resins for use as the hydrophobic crosslinking agent (3) in the thermosettable dispersion of the present invention include those which are fully alkylated with butanol, such as CYMEL 1156 which is commercially available from Cytec Industries, Inc.

Other useful hydrophobic crosslinking agents include polyisocyanates which are useful for crosslinking hydroxyl and/or amine functional group-containing materials. Polyisocyanates which are preferred for use as the hydrophobic crosslinking agent (3) in the present invention are blocked diisocyanates. Examples of suitable diisocyanates which can be utilized herein include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures including lower aliphatic alcohols such as methanol, oximes such as methyl ethyl ketoxime and lactams such as caprolactam.

Also known in the art for crosslinking hydroxyl functional group-containing materials are triazine compounds such as the tricarbamoyl triazine compounds which are described in detail in U.S. Pat. No. 5,084,541, incorporated herein by reference.

If desired, mixtures of the above hydrophobic crosslinking agents can be used.

The amount of the hydrophobic crosslinking agent (3) present in the thermosettable dispersion prior to crosslinking with the functional groups of the reaction product (1) and the hydrophobic polymer (2) typically is at least 5 to at least 10 weight percent, preferably at least 10 to at least 25 weight percent, and more preferably at least 25 to at least 35 weight percent based on total resin solids weight of the thermosettable dispersion. The amount of the hydrophobic crosslinking agent (3) present in the thermosettable dispersion typically is also less than 90 to less than 80 weight percent, preferably less than 80 to less than 70 weight percent, and more preferably less than 70 to less than 60 weight percent based on total resin solids weight of the thermosettable dispersion. The amount of the hydrophobic crosslinking agent (3) present in the thermosettable dispersion can range between any combination of these values inclusive of the recited ranges.

In a preferred embodiment, the dispersion of polymeric microparticles in an aqueous medium is prepared by a high stress technique which is described more fully below. First, the ethylenically unsaturated monomers utilized to prepare the microparticle are thoroughly mixed with the aqueous medium and the hydrophobic polymer and the hydrophobic crosslinker. For the present application, the ethylenically unsaturated monomers together with the hydrophobic polymer and the hydrophobic crosslinker are referred to as the organic component. The organic component generally also comprises other organic species and preferably is substantially free of organic solvent, i.e., no more than percent of organic solvent is present. The mixture is then subjected to stress in order to particulate it into microparticles which are uniformly of a fine particle size. The mixture is subjected to stress sufficient to result in a dispersion such that after polymerization less than 20 percent of the polymer microparticles have a mean diameter greater than 5 micrometers as determined using a particle size analyzer as described in further detail below.

The aqueous medium provides the continuous phase of dispersion in which the microparticles are suspended. The aqueous medium is generally exclusively water. However, for some polymer systems, it can be desirable to also include a minor amount of inert organic solvent which can assist in lowering the viscosity of the polymer to be dispersed. For example, if the organic phase has a Brookfield viscosity greater than 1000 centipoise at 25° C. or a W Gardner-Holdt viscosity, some solvent can be used. Examples of suitable solvents which can be incorporated in the organic component are benzyl alcohol, xylene, methyl isobutyl ketone, mineral spirits, butanol, butyl acetate, tributyl phosphate and dibutyl phthalate.

As was mentioned above, the mixture is subjected to the appropriate stress by use of a MICROFLUIDIZER® emulsifier which is available from Microfluidics Corporation in Newton, Massachusetts. The MICROFLUIDIZER® high pressure impingement emulsifier is disclosed in U.S. Pat. No. 4,533,254, which is hereby incorporated by reference. The device consists of a high pressure (up to about $1.4 \times 10^5$ kPa (20,000 psi)) pump and an interaction chamber in which emulsification takes place. The pump forces the mixture of reactants in aqueous medium into the chamber where it is split into at least two streams which pass at very high velocity through at least two slits and collide, resulting in the particulation of the mixture into small particles. Generally, the reaction mixture is passed through the emulsifier once at a pressure of between about $3.5 \times 10^4$ and about $1 \times 10^5$ kPa (5,000 and 15,000 psi). Multiple passes can result in smaller average particle size and a narrower range for the particle size distribution. When using the aforesaid MICROFLUIDIZER® emulsifier, stress is applied by liquid-liquid impingement as has been described. However, it should be understood that, if desired, other modes of applying stress to the pre-emulsification mixture can be utilized so long as sufficient stress is applied to achieve the requisite particle size distribution, that is, such that after polymerization less than 20 percent of the polymer microparticles have a mean diameter greater than 5 micrometers. For example, one alternative manner of applying stress would be the use of ultrasonic energy.

Stress is described as force per unit area. Although the precise mechanism by which the MICROFLUIDIZER® emulsifier stresses the pre-emulsification mixture to particulate it is not thoroughly understood, it is theorized that stress is exerted in more than one manner. It is believed that one manner in which stress is exerted is by shear, that is, the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by any particular theory, it is believed that both shear and cavitation contribute to producing the stress which particulates the pre-emulsification mixture.

Once the mixture has been particulated into microparticles, the polymerizable species within each particle are polymerized under conditions sufficient to produce polymer microparticles which are stably dispersed in the aqueous medium. Preferably, a surfactant or dispersant is present to stabilize the dispersion. The surfactant is preferably present when the organic component referred to above is mixed into the aqueous medium prior to particulation. Alternatively, the surfactant can be introduced into the medium at a point just after the particulation within the MICROFLUIDIZER® emulsifier. The surfactant, however, can be an important part of the particle forming process and is often necessary to achieve the requisite dispersion stability. The surfactant also can be employed to prevent the emulsified particles from forming agglomerates.

Examples of suitable surfactants include the dimethylethanolamine salt of dodecylbenzenesulfonic acid, sodium dioctylsulfosuccinate, ethoxylated nonylphenol and sodium dodecyl benzene sulfonate. Other materials well known to those skilled in the art also are suitable for use herein. Generally, both ionic and non-ionic surfactants are used together and the amount of surfactant ranges from about 1 percent to about 10 percent, preferably from about 2 percent to about 4 percent, the percentage based on the total solids. One particularly preferred surfactant for the preparation of aminoplast curable dispersions is the dimethylethanolamine salt of dodecylbenzenesulfonic acid.

In order to conduct the polymerization of the ethylenically unsaturated monomers, a free radical initiator is usually present. Both water soluble and oil soluble initiators can be used. Since the addition of certain initiators, such as redox initiators, can result in a strong exothermic reaction, it is generally desirable to add the initiator to the other ingredients immediately before the reaction is to be conducted. Examples of water soluble initiators include ammonium peroxydisulfate, potassium peroxydisulfate and hydrogen peroxide. Examples of oil soluble initiators include t-butyl hydroperoxide, dilauryl peroxide, t-butyl perbenzoate and 2,2'-azobis(isobutyronitrile). Preferably redox initiators such as ammonium peroxydisulfate/sodium metabisulfite or t-butylhydroperoxide/isoascorbic acid are utilized herein.

It should be understood that in some instances it can be desirable for some of the reactant species to be added after particulation of the remaining reactants and the aqueous medium, for example, water soluble acrylic monomers such as hydroxypropyl methacrylate.

The particulated mixture is then subjected to conditions sufficient to induce polymerization of the polymerizable species within the microparticles. The particular conditions will vary depending upon the actual materials being polymerized. The length of time required to complete polymerization typically varies from about 10 minutes to about 6 hours. The progress of the polymerization reaction can be followed by techniques conventionally known to those skilled in the art of polymer chemistry. For example, heat generation, monomer concentration and percent of total solids are all methods of monitoring the progress of the polymerization.

The aqueous microparticle dispersions can be prepared by a batch process or a continuous process. In one example of a batch process, the unreacted microdispersion is fed over a period of about 1 to 4 hours into a heated reactor initially charged with water. The initiator can be fed in simultaneously, it can be part of the microdispersion or it can be charged to the reactor before feeding in the microdispersion. The optimum temperature depends upon the specific initiator being used. The length of time typically ranges from about 2 hours to about 6 hours.

In an alternative batch process, a reactor vessel is charged with the entire amount of microdispersion to be polymerized. Polymerization commences when an appropriate initiator such as a redox initiator is added. An appropriate initial temperature is chosen such that the heat of polymerization does not increase the batch temperature beyond the boiling point of the ingredients. Thus for large scale production, it is preferred that the microdispersion have sufficient heat capacity to absorb the total amount of heat being generated.

In a continuous process, the pre-emulsion or mixture of raw materials is passed through the homogenizer to make a microdispersion which is immediately passed through a heated tube, e.g., stainless steel, or a heat exchanger in which polymerization takes place. The initiator is added to the microdispersion just before it enters the tubing.

It is preferred to use redox type initiators in the continuous process since other initiators can produce gases such as nitrogen or carbon dioxide which can cause the latex to spurt out of the reaction tubing prematurely. The temperature of reaction can range from about 25° C. to about 80° C., preferably about 35° C. to about 45° C. The residence time typically ranges from about 5 minutes to about 30 minutes.

The tubing in which the reaction occurs is not required to heat the microdispersion but rather to remove the heat being generated. Once the initiator has been added, the reaction begins spontaneously after a short induction period and the reaction exotherm resulting from the polymerization will rapidly raise the temperature.

If there is still free monomer remaining after all of the initiator is consumed, an additional amount of initiator can be added to scavenge the remaining monomer.

Once the polymerization is complete, the resultant product is a stable dispersion of polymer microparticles in an aqueous medium, wherein both the polymer formed from the ethylenically unsaturated monomers, the substantially hydrophobic polymer and the hydrophobic crosslinking agent are contained within each microparticle. The aqueous medium, therefore, is substantially free of water soluble polymer. The resultant polymer microparticles are, of course, insoluble in the aqueous medium. As used herein, "substantially free" means that the aqueous medium contains less than 30 percent by weight of dissolved polymer, preferably less than 15 percent.

By "stably dispersed" is meant that the polymer microparticles do not settle upon standing and do not coagulate or flocculate upon standing. Typically, when diluted to 50 percent total solids, the microparticle dispersions do not settle even when aged for one month at room temperature.

As was stated above, a very important aspect of the polymer microparticle dispersions is that the particle size is uniformly small, i.e., after polymerization less than 20 percent of the polymer microparticles have a mean diameter which is greater than 5 micrometers, more preferably greater than 1 micrometer. Generally, the microparticles have a mean diameter from about 0.01 micrometers to about 10 micrometers. Preferably the mean diameter of the particles after polymerization ranges from about 0.05 micrometer to about 0.5 micrometer. The particle size can be measured with a particle size analyzer such as the Coulter N4 instrument commercially available from Coulter.

The microparticle dispersions are high solids materials of low viscosity. Dispersions can be prepared directly with a total solids content of from 45 percent to 60 percent. They can also be prepared at a lower solids level of 30 to 40 percent total solids and concentrated to a higher level of solids of 55 to 65 percent by stripping. The molecular weight of the polymer and viscosity of the claimed aqueous dispersions are independent of each other. The weight average molecular weight can range from a few hundred to greater than 100,000. The Brookfield viscosity also can vary widely from 0.01 poise to 100 poise, depending on the solids and composition, preferably from 0.2 to 5 poise when measured at 25° C. using an appropriate spindle at 50 RPM.

Microparticles can have a core/shell morphology if suitable hydrophilic ethylenically unsaturated monomer(s) are included in the mixture of monomer(s) used to produce reaction product (1), the hydrophobic polymer (2) and the hydrophobic crosslinking agent (3). Due to their hydrophobic nature, the hydrophobic polymer and the hydrophobic crosslinking agent will tend to be incorporated into the interior, or "core", of the microparticle and the hydrophilic monomer(s) will tend to be incorporated into the exterior, or "shell", of the microparticles. Suitable hydrophilic monomers include, for example, acrylic acid, methacrylic acid, vinyl acetate, N-methylol acrylamide, hydroxyethyl acrylate, and hydroxypropyl methacrylate. As mentioned in U.S. Pat. No. 5,071,904, it may be desirable to add water soluble monomer(s) after the other components of the dispersion of polymeric microparticles have been particularized into microparticles.

Acrylic acid is a particularly useful hydrophilic monomer for use in the present invention. In order to obtain the advantages of a high solids waterborne coating composition, the coating composition should have sufficiently low viscosity to allow adequate atomization of the coating during spray application. The viscosity of the film-forming composition can be controlled partially by choosing components and reaction conditions that control the amount of hydrophilic polymer in the aqueous phase and in the shell of the polymeric microparticles. Interactions among microparticles, and consequently the rheology of coatings containing them, are greatly affected by the ionic charge density on the surface of the microparticles. Charge density can be increased by increasing the amount of acrylic acid polymerized into the shell of a microparticle. The amount of acrylic acid incorporated into the shell of a microparticle can also be increased by increasing the pH of the aqueous medium in which the polymerization takes place.

Dispersions of polymeric microparticles containing more than about 5 percent by weight of acrylic acid, or having an acid value greater than 40 if acid functional monomers other than acrylic acid are used, are generally too viscous to provide high solids coating compositions. The preferred amount of acrylic acid is generally between about 1 and about 3 percent by weight of the total polymer in the dispersion or latex. Therefore, the acid value of the polymer in the dispersion of polymeric microparticles is preferably between about 8 and about 24.

The microparticle can be internally crosslinked, if desired, by including at least one ethylenically unsaturated monomer which has more than one reactive site of unsaturation. Suitable monomers which have more than one reactive site of unsaturation include ethylene glycol dimethacrylate, which is preferred, allyl methacrylate, hexanediol diacrylate, methacrylic anhydride, tetraethylene glycol diacrylate, tripropylene glycol diacrylate, and the like. When the microparticle is non-crosslinked, the polymer(s) can be either linear or branched. When the microparticles are internally crosslinked via an ethylenically unsaturated monomer which has more than one reactive site of unsaturation, the microparticles are referred to as a microgel. Non-crosslinked microparticles are generally preferred. However, when crosslinked microparticles are used, a low degree of internal crosslinking, such as would be obtained when ethylene glycol dimethacrylate is present in an amount ranging from one to three percent by weight of the total resin solids in the dispersion, is preferred.

In an alternative embodiment discussed briefly above, the reaction product (1), hydrophobic polymer (2), and the hydrophobic crosslinking agent (3) can be mixed without the use of a MICROFLUIDIZER® as follows. For low number average molecular weight hydrophobic polymers (between about 500 and about 800), the polymerized reaction product (1), hydrophobic polymer (2) and hydrophobic crosslinking agent (3) are mixed together using conventional mixing techniques which are well known to those skilled in the art. Higher number average molecular weight hydrophobic polymers (greater than about 800) are preferably pre-dissolved in a coupling solvent such as the monobutyl ether of ethylene glycol and mixed with the polymerized reaction product (1) using conventional mixing techniques well known to those skilled in the art, such as high shear mixing techniques.

The amount of the thermosettable dispersion resin solids present in the film-forming composition of the present invention typically ranges from at least 30 to at least 40 weight percent, preferably from at least 40 to at least 50 weight percent, and more preferably from at least 50 to at least 60 weight percent based on total resin solids weight of the film-forming composition. The amount of the thermosettable dispersion present in the film-forming composition of the invention also can range from less than 90 to less than 85 weight percent, preferably less than 85 to less than 80, and more preferably less than 80 to less than 70 weight percent based on total resin solids weight of the film-forming composition. The amount of the thermosettable dispersion present in the film-forming composition can range between any combination of these values inclusive of the recited ranges.

As discussed above, the film-forming composition also can further comprise one or more hydrophilic crosslinking agents which are adapted to react with the functional groups of the polymeric microparticles to cure the film-forming composition. Non-limiting examples of suitable crosslinking agents include hydrophilic aminoplasts and polyisocyanates as are described generally above which are adapted to be water soluble or water dispersible as described below, polyacids, polyanhydrides and mixtures thereof. The crosslinking agent or mixture of crosslinking agents used in the film-forming composition is dependent upon the functionality associated with the polymer microparticles, such as hydroxyl and/or carbamate functionality. Preferably, the functionality is hydroxyl and the crosslinking agent is a hydrophilic aminoplast or polyisocyanate.

As aforementioned, the crosslinking agents which are useful as a component in the topcoat film-forming composition of the invention must be hydrophilic, that is, they must be adapted to be water soluble or water dispersible. For example, aminoplast resins suitable for use as the hydrophilic crosslinking agent can include those which contain methylol or similar alkylol groups, a portion of which have been etherified by reaction with a lower alcohol, preferably methanol, to provide a water soluble/dispersible aminoplast resin. Exemplary of the preferred aminoplast resin is the partially methylated aminoplast resin, CYMEL 385, which is commercially available from Cytec Industries, Inc. An example of a hydrophilic blocked isocyanate suitable for use as the hydrophilic crosslinking agent is dimethyl pyrazole blocked hexamethylene diisocyanate trimer commercially available as BI 7986 from Baxenden Chemicals, Ltd. in Lancashire, England.

Polyacid crosslinking materials suitable for use in the present invention on average generally contain greater than one acid group per molecule, more preferably three or more and most preferably four or more, such acid groups being reactive with epoxy functional film-forming polymers. Preferred polyacid crosslinking materials have di-, tri- or higher functionalities. Suitable polyacid crosslinking materials which can be used include carboxylic acid group-containing oligomers, polymers and compounds, such as acrylic polymers, polyesters, and polyurethanes and compounds having phosphorus-based acid groups.

Examples of suitable polyacid crosslinking agents include ester group-containing oligomers and compounds including half-esters formed from reacting polyols and cyclic 1,2-acid anhydrides or acid functional polyesters derived from polyols and polyacids or anhydrides. These half-esters are of relatively low molecular weight and are quite reactive with epoxy functionality. Suitable ester group-containing oligomers are described in U.S. Pat. No. 4,764,430, column 4, line 26 to column 5, line 68, which is hereby incorporated by reference.

Other useful hydrophilic crosslinking agents include acid-functional acrylic crosslinkers made by copolymerizing methacrylic acid and/or acrylic acid monomers with other ethylenically unsaturated copolymerizable monomers as the polyacid crosslinking material. Alternatively, acid-functional acrylics can be prepared from hydroxy-functional acrylics reacted with cyclic anhydrides.

Preferred hydrophilic crosslinking agents include hydrophilic aminoplast resins or blocked polyisocyanates.

The hydrophilic crosslinking agent is typically present in the film-forming composition in an amount ranging from 0 to at least 10 weight percent, preferably at least 10 to at least 20 weight percent, and more preferably from at least 20 to at least 30 weight percent based on total resin solids weight in the film-forming composition. The hydrophilic crosslinking agent also typically is present in the film-forming composition in an amount ranging from less than 70 to less than 60 weight percent, preferably from less than 60 to less than 50 weight percent, and more preferably from less than 50 to less than 40 weight percent based on total resin solids weight of the film-forming composition. The hydrophilic crosslinking agent can be present in the film-forming composition in an amount ranging between any combination of these values inclusive of the recited ranges.

The film-forming composition can contain, in addition to the components described above, a variety of other adjuvant materials. If desired, other resinous materials can be utilized in conjunction with the dispersion of polymeric microparticles so long as the resultant coating composition is not detrimentally affected in terms of application, physical performance and properties.

Such adjuvant materials can include, for example, amphiphilic adjuvants which have a water soluble, generally hydrophilic polar end and a water-insoluble, generally hydrophobic hydrocarbon end. Such adjuvants can be present as a compound consisting of a single molecular species, an oligomer or a polymer, but preferably is an oligomer having a number average molecular weight ranging from about 200 to about 3000 grams per mole, and more preferably about 300 to about 800 grams per mole, as determined by gel permeation chromatography using polystyrene as a standard.

Such adjuvant materials are preferably essentially free of acid functionality, i.e., it has an acid value of less than 30 mg KOH/g adjuvant, preferably less than about 20 mg KOH/g adjuvant, more preferably less than about 10 mg KOH/g adjuvant, and most preferably less than about 5 mg KOH/g adjuvant.

The adjuvant has one or more terminal hydrophilic groups positioned at its water soluble polar end. Suitable hydrophilic groups include hydroxyl groups (preferred), carbamate groups, amide groups, urea groups and mercaptan groups. One or more or combinations of these groups can be present as pendant functional groups along the backbone of the adjuvant. Preferably, the hydrophilic polar end of the adjuvant has one or more, and preferably an average of one to about three, terminal hydroxyl groups.

The hydrocarbon end of the adjuvant can be a pendant or terminal end group, but preferably is a terminal end group positioned generally opposite to the water soluble polar end of the adjuvant. The hydrocarbon end of the adjuvant comprises at least six contiguous carbon atoms, preferably in a linear hydrocarbon chain and preferably is free of hydrophilic functional groups.

Such adjuvant materials can be saturated or unsaturated, branched or unbranched, and can include functional groups such ester groups and/or ether groups and/or other functional groups containing nitrogen, oxygen, or sulfur. Preferably such functional groups are not positioned near the hydrophobic end.

Such adjuvant materials can be prepared by esterification of reactants comprising one or more monocarboxylic acids and one or more polyols, preferably in a 1:1 molar ratio. Suitable monocarboxylic acids include heptanoic acid, caprylic acid, pelargonic acid, capric acid, n-undecylic acid, lauric acid, myristic acid, palmitic acid, margaric acid, stearic acid, isostearic acid, arachidic acid, behenic acid, lignoceric acid, cerotic acid, oleic acid, elaidic acid, linoleic acid, linolenic acid, dihydroxystearic acid, ricinoleic acid and isomers and mixtures thereof. Useful polyols include 1,4-butanediol, 1,6hexanediol, neopentyl glycol, ethylene glycol, diethylene glycol, 2,3-butylene glycol, glycerol, trimethylolpropane, ditrimethylolpropane, pentaerythritol, sorbitol, mannitol and mixtures thereof. The polyol can include terminal groups such as short chain alkyl groups having 1 to 4 carbon atoms or amido groups.

Non-limiting examples of adjuvant materials prepared by the above esterification reaction include trimethylolpropane monoisostearate, ditrimethylolpropane isostearate, pentaerythritol isostearate and pentaerythritol diisostearate.

Additional reactants can be included in the reaction, such as one or more polycarboxylic acids, polyfunctional amines, polyfunctional isocyanates and mixtures thereof. Useful polycarboxylic acids include 1,4-cyclohexane dicarboxylic acid, dimer fatty acids, and other carboxylic acids such as are disclosed in U.S. Pat. No. 5,468,802 at column 2, lines 49–65 which are incorporated by reference herein. A useful mixture of isomers of 1,4-cyclohexane dicarboxylic acid is commercially available as EASTMAN® 1,4-CHDA from Eastman Kodak. For preparing a reaction product of isostearic acid, trimethylolpropane and 1,4-cyclohexane dicarboxylic acid, a high purity grade of EASTMAN® 1,4-CHDA having approximately 80:20 cis:trans isomers is preferred, although the "R" grade having 60:40 cis:trans also can be used. An example of a suitable adjuvant prepared by the above reaction using an polyfunctional amine instead of a polycarboxylic acid is stearyl diethanolamide.

Generally, if present, the polycarboxylic acid is present as an additional reactant in an amount of less than about 50 weight percent on a basis of total weight of the reactants from which the adjuvant reaction product is prepared, preferably less than about 30 weight percent and, more preferably, less than about 20 weight percent.

The esterification reaction is carried out in accordance with techniques which are well known to those skilled in the art of polymer chemistry and a detailed discussion is not believed to be necessary. Generally, the reaction can be conducted by combining the ingredients and heating to a temperature of about 160° C. to about 230° C. Further details of the esterification process are disclosed in U.S. Pat. No. 5,468,802 at column 3, lines 4–20 and 39–45, which are incorporated by reference herein.

Alternatively, the adjuvant material can be prepared from the reaction of one or more polycarboxylic acids, one or more polyols and one or more hydrocarbon alcohols comprising at least six contiguous carbon atoms in a manner well known to one skilled in the art. An example of this reaction is the formation of an oligomeric ester from phthalic anhydride, pentaerythritol and stearyl alcohol. Suitable polycarboxylic acids and polyols are discussed above. Useful hydrocarbon alcohols include heptyl alcohol, octyl alcohol, pelargonic alcohol, n-decyl alcohol, n-undecyl alcohol, lauryl alcohol, myristyl alcohol, cetyl alcohol, margaryl alcohol, stearyl alcohol, isostearyl alcohol, nnonadecyl alcohol, arachidyl alcohol, ceryl alcohol, palmitoleyl alcohol, oleyl alcohol, linoleyl alcohol, linolenyl alcohol, ricinoleyl alcohol and mixtures thereof.

Alternatively, the adjuvant can be prepared by reacting one or more amines comprising at least six contiguous carbon atoms and one or more reactants selected from carbonates or polycarboxylic acids and polyols in a manner well known to the skilled artisan. A non-limiting example is the reaction product of stearyl amine with glycerin carbonate to form N-stearyl dihydroxypropyl carbamate. Another example is the oligoamide-ester reaction product of stearyl amine with isophthalic acid and pentaerythritol. Useful amines include heptyl amine, octyl amine, pelargonyl amine, n-decyl amine, n-undecyl amine, lauryl amine, myristyl amine, cetyl amine, margyryl amine, stearyl amine, n-nonadecyl amine, arachidyl amine, and isomers and mixtures thereof. Suitable polycarboxylic acids and polyols are discussed above.

In yet another alternative embodiment, the adjuvant material can be prepared by reacting one or more monocarboxylic acids with one or more epoxides, such as the glycidyl ether of versatic acid or glycidol, in a manner well known to one skilled in the art. A non-limiting example of an adjuvant prepared according to this reaction is the reaction product of isostearic acid and glycidol. Useful monocarboxylic acids are discussed above.

The adjuvant of the present invention can be added to the topcoat film-forming composition "neat"; that is, it is added by itself or in other resinous ingredients, or with solvents or other diluents.

Examples of other suitable adjuvant materials include aliphatic, low molecular weight urethane diol oligomers such as K-Flex® UD-350W available from King Industries.

Generally, if employed, the adjuvant material is present in an amount ranging from about 0.01 to about 25 weight percent on a basis of total resin solids of the topcoat film-forming composition, preferably about 0.1 to about 20 weight percent and, more preferably, about 0.1 to about 15 weight percent.

Exemplary of other suitable adjuvant materials include hydrophilic reactive functional group-containing polysiloxanes, for example, the hydroxyl, carboxylic acid and amine functional group-containing polysiloxanes disclosed in U.S. Pat. Nos. 5,916,992 and 5,939,491 and co-pending U.S. Pat. Ser. No. 08/986,812 filed Dec. 8, 1997 patented Mar. 7, 2000 U.S. Pat. No. 6,033,545 which are incorporated herein by reference. It should be understood that the polysiloxanes which are useful in the compositions of the present invention as adjuvant materials must be hydrophilic, that is, they are or have been adapted to be water soluble or water dispersible.

These functional group-containing polysiloxanes typically are the hydrosilylation reaction products of a polysiloxane containing silicon hydride and a functional group-containing material having at least one unsaturated bond capable of undergoing hydrosilylation reaction. For example, 1,1,3,3-tetramethyl disiloxane and/or polymethyl polysiloxane having two or more Si—H groups can be reacted with one or more hydroxyl group-containing materials having at least one unsaturated bond capable of undergoing hydrosilylation reaction. Nonlimiting examples of suitable hydroxyl group-containing materials having at least one unsaturated bond include trimethylolpropane monoallyl ether, pentaerythritol monoallyl ether, trimethylolpropane diallyl ether, polyethoxylated allyl alcohol, polypropoxylated allyl alcohol and allyl alcohol.

In addition, substantially colorless inorganic microparticles, such as silica, for example, colloidal silica, to provide enhanced mar and scratch resistance can be present. Other suitable inorganic microparticles include fumed silica, amorphous silica, alumina, colloidal alumina, titanium dioxide, zirconia, colloidal zirconia and mixtures thereof. These materials can constitute up to 30 percent by weight of the total weight of the film-forming composition.

The solids content of the topcoat film-forming composition generally ranges from 25 to 70 weight percent on a basis of total weight of the film-forming composition, preferably 45 to 65 weight percent, and more preferably 50 to 60 weight percent.

The film-forming composition preferably also contains a catalyst to accelerate the cure reaction, for example, between the aminoplast curing agent and the reactive hydroxyl and/or carbamate functional groups of the thermosettable dispersion. Examples of suitable catalysts include acidic materials, for example, acid phosphates, such as phenyl acid phosphate, and substituted or unsubstituted sulfonic acids such as dodecylbenzene sulfonic acid or paratoluene sulfonic acid. The catalyst usually is present in an amount ranging from 0.1 to 5.0 percent by weight, preferably 0.5 to 1.5 percent by weight, based on the total weight of resin solids.

Other additive ingredients, for example, plasticizers, surfactants, thixotropic agents, anti-gassing agents, flow controllers, anti-oxidants, UV light absorbers and similar additives conventional in the art can be included in the composition. These ingredients typically are present in an amount of up to about 40 percent by weight based on the total weight of resin solids.

As aforementioned, the multi-component composite coating compositions of the present invention comprise a pigmented film-forming composition serving as a base coat (i.e., a color coat) and a film-forming composition applied over the base coat serving as a transparent topcoat (i.e., a clear coat). The base coat and clear coat compositions used in the multi-component composite coating compositions of the invention are preferably formulated into liquid high solids coating compositions, that is, compositions containing 40 percent, preferably greater than 50 percent by weight resin solids. The solids content is determined by heating a sample of the composition to 105° to 110° C. for 1–2 hours to drive off the volatile material, and subsequently measuring relative weight loss.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds and polyurethanes such as those discussed in detail above.

The resinous binders for the base coat can be organic solvent-based materials such as those described in U.S. Pat. No. 4,220,679, note column 2 line 24 continuing through column 4, line 40, which is incorporated herein by reference. Also, water-based coating compositions such as those described in U.S. Pat. No. 4,403,003, U.S. Pat. No. 4,147,679 and U.S. Pat. No. 5,071,904 (incorporated herein by reference) can be used as the binder in the base coat composition.

The base coat composition contains pigments as colorants. Suitable metallic pigments include aluminum flake, copper bronze flake and metal oxide coated mica. Besides the metallic pigments, the base coat compositions can contain non-metallic color pigments conventionally used in surface coatings including inorganic pigments such as titanium dioxide, iron oxide, chromium oxide, lead chromate, and carbon black; and organic pigments such as phthalocyanine blue and phthalocyanine green.

Optional ingredients in the base coat composition include those which are well known in the art of formulating surface coatings, such as surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679, 4,403,003, 4,147,769 and 5,071,904, which are incorporated herein by reference.

The base coat compositions can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

During application of the base coat to the substrate, the film thickness of the base coat formed on the substrate is typically 0.1 to 5 mils (about 2.54 to about 127 micrometers), preferably 0.1 to 2 mils (about 2.54 to about 50.4 micrometers).

After forming a film of the base coat on the substrate, the base coat can be cured or alternately given a drying step in which solvent is driven out of the base coat film by heating or an air drying period before application of the clear coat. Suitable drying conditions will depend on the particular base coat composition, and on the ambient humidity if the composition is waterborne, but preferably, a drying time of from about 1 to 15 minutes at a temperature of about 75° to 200° F. (21° to 93° C.) will be adequate.

The solids content of the base coating composition generally ranges from about 15 to about 60 weight percent, and preferably about 20 to about 50 weight percent.

The transparent topcoat (or clear coat) composition discussed in detail above typically is applied to the base coat by spray application, however, the topcoat can be applied by any conventional coating technique as described above. Any of the known spraying techniques can be used such as compressed air spraying, electrostatic spraying and either manual or automatic methods. As mentioned above, the clear topcoat can be applied to a cured or to a dried base coat before the base coat has been cured. In the latter instance, the two coatings are then heated to cure both coating layers simultaneously. Typical curing conditions range from 265° to 350° F. (129° to 175° C.) for 20 to 30 minutes. The clear coating thickness (dry film thickness) is typically 1 to 6 mils (about 25.4 to about 152.4 micrometers).

During application of the clear coating composition to the substrate, ambient relative humidity generally can range from about 30 to about 80 percent, preferably about 50 percent to 70 percent.

In an alternative embodiment, after the base coat is applied (and cured, if desired), multiple layers of transparent coatings can be applied over the base coat. For example, one or more layers of a conventional transparent or clear coat can be applied over the base coat and one or more layers of transparent coating of the present invention applied thereon. Alternatively, one or more layers of a transparent coating of the present invention can be applied over the base coat and one or more conventional transparent coatings applied thereover.

The multi-component composite coating compositions can be applied over virtually any substrate including wood, metals, glass, cloth, plastic, foam, including elastomeric substrates and the like. They are particularly useful in applications over metals and elastomeric substrates that are found on motor vehicles. The substantially solvent-free topcoat film-forming compositions of the present invention provide multi-component composite coating systems that have appearance and performance properties commensurate with those provided by solvent-based counterparts with appreciably less volatile organic emissions during application.

In an alternative embodiment, the substantially solvent-free film-forming composition can be formulated to include pigment. These pigmented film-forming compositions are suitable for use in primer coating compositions, as a pigmented base coating composition in multi-component composite coating compositions or as a monocoat.

Illustrating the invention are the following examples which, however, are not to be considered as limiting the invention to their details. Unless otherwise indicated, all parts and percentages in the following examples, as well as throughout the specification, are by weight.

EXAMPLES

Examples 1 through 5 describe the preparation of hydrophobic pre-polymers used to form the thermosettable dispersions of the present invention. Each of Examples 1–2 describes the preparation of a polyester pre-polymer; Example 3 describes the preparation of a polyurethane pre-polymer; and Examples 4 and 5 describe the preparation of a polyester carbamate pre-polymer and a polyurethane carbamate pre-polymer, respectively.

Example 6 describes the preparation of a blocked isocyanate crosslinker used in the preparation of the polyurethane/acrylic microparticle dispersions of Examples 8A, 8B and 9.

Examples 7A and 7B describe the preparation of a polyester/acrylic microparticle dispersion which contains the polyester pre-polymer of Example 1. Example 7A contains a hydrophobic blocked isocyanate crosslinking agent and Example 7B contains no hydrophobic crosslinker.

Examples 8A and 8B describe the preparation of a polyurethane carbamate/acrylic latex which contains the polyurethane carbamate pre-polymer of Example 5. Example 8A contains the hydrophobic crosslinker of Example 6 and Example 8B contains no hydrophobic crosslinking agent.

Example 9 uses the polyurethane pre-polymer of Example 3 and the blocked isocyanate crosslinker of Example 6. Examples 10A through 12 describe the preparation of topcoat film-forming compositions of the present invention. Example 10 A describes the preparation of a solvent-free topcoat film-forming composition which contains the polyester/acrylic microparticle dispersion of Example 7A and a hydrophilic aminoplast crosslinker. Example 10B describes the preparation of a solvent-free topcoat film-forming composition which contains the polyester/acrylic microparticle dispersion of Example 7B and a hydrophilic aminoplast crosslinker.

Example 11A describes the preparation of a topcoat film-forming composition which contains the polyurethane carbamate/acrylic microparticle dispersion of Example 8A and a hydrophilic aminoplast crosslinker. Example 11B describes the preparation of a topcoat film-forming composition which contains the polyurethane carbamate/acrylic microparticle dispersion of Example 8B and a hydrophilic aminoplast crosslinker. Example 12 describes the preparation of a topcoat film-forming composition which contains the polyurethane/acrylic microparticle dispersion of Example 9 and a hydrophilic aminoplast crosslinker.

Example 1

Polyester Pre-polymer

The polyester was prepared in a four neck round bottom flask equipped with a thermometer, mechanical stirrer, distillation head and condenser, dry nitrogen sparge, and a heating mantle. The following ingredients were used:

| | |
|---|---|
| 4335.7 g | hexahydrophthalic anhydride |
| 1542.6 g | neopentyl glycol |
| 2005.2 g | 2,2,4-trimethyl-1,3-pentanediol |
| 938.0 g | trimethylolpropane |
| 9.7 g | triphenyl phosphite |
| 13.3 g | butylstannoic acid |

All ingredients were stirred in the flask at 200° C. until 470 ml of distillate was collected and the acid value dropped to 11. The final product was a colorless liquid with a hydroxyl value of 144, a Gardner-Holdt viscosity of Z1, and a non-volatile content of 99.6% (measured at 110° C. for one hour).

Example 2

Polyester Pre-polymer

The polyester was prepared in a four neck round bottom flask equipped with a thermometer, mechanical stirrer, distillation head and condenser, dry nitrogen sparge, and a heating mantle. The following ingredients were used:

| | |
|---|---|
| 2824.0 g | 1,6-hexanediol |
| 3685.0 g | hexahydrophthalic anhydride |
| 2490.0 g | neopentyl glycol |
| 4.5 g | triphenyl phosphite |
| 6.5 g | butylstannoic acid |

All ingredients were stirred in the flask at 200° C. until 450 ml of distillate was collected. The final product was a colorless liquid with a Gardner-Holdt viscosity of Z4+, a hydroxyl value of 299, and an acid value of 0.7.

Example 3

Polyurethane Pre-polymer

The polyurethane was prepared in a four neck round bottom flask equipped with a thermometer, mechanical stirrer, condenser, dry nitrogen atmosphere, and a heating mantle. The following ingredients were used:

| | |
|---|---|
| 3864.0 g | polyester of Example 2 |
| 420.0 g | trimethylolpropane |
| 84.0 g | hydroxyethyl methacrylate |
| 4.0 g | dibutyl tin dilaurate |
| 8.0 g | butylated hydroxytoluene (BHT) |
| 1322.0 g | isophorone diisocyanate |
| 265.0 g | methyl methacrylate |

The first four ingredients plus one half of the BHT were stirred in the flask at 70° C. to 80° C. under an air blanket. The isophorone diisocyanate was added over a period of one hour and 45 minutes and the resulting mixture was heated at 80° C. for an additional one hour and 15 minutes. The methyl methacrylate and the remainder of the BHT were added to make an 80% solution. The final product was a colorless liquid with a Gardner-Holdt viscosity of Z1+ and a hydroxyl value of 164.

Example 4

Polyester Carbamate Pre-polymer

The polyester was prepared in a four neck round bottom flask equipped with a thermometer, mechanical stirrer, distillation head and condenser, dry nitrogen sparge, and a heating mantle. The following ingredients were used:

| | |
|---|---|
| 4359.0 g | 1,6-hexanediol |
| 1652.6 g | adipic acid |
| 2262.8 g | hexahydrophthalic anhydride |
| 5.5 g | triphenyl phosphite |
| 0.9 g | butylstannoic acid |

All ingredients were stirred in the flask at 220° C. until 610 ml of distillate was collected. The polyester was a clear liquid with a Gardner-Holdt viscosity of Y-Z, and an acid value of 0.7. The following ingredients were added to the polyester:

| | |
|---|---|
| 610.1 g | methyl carbamate |
| 732.1 g | monomethyl ether of propylene glycol |
| 14.6 g | triphenyl phosphite |
| 14.6 g | butylstannoic acid |

The mixture was heated at 140° C. for one hour before beginning to collect distillate at a head temperature of less than 750° C. After 230 g of distillate was collected a vacuum was applied while keeping the batch temperature at 140° C. to 145° C. and the head temperature at 650° C. to 85° C. A total of 862 g of distillate was collected. The final product was a partially solid liquid with a hydroxyl value of 103 and a non-volatile content of 97.6% (measured at 110° C. for one hour).

Example 5

Polyurethane Carbamate Pre-polymer

The polyurethane was prepared in a four neck round bottom flask equipped with a thermometer, mechanical stirrer, condenser, dry nitrogen atmosphere, and a heating mantle. The following ingredients were used:

| | |
|---|---|
| 2052.0 g | polyester of Example 4 |
| 300.0 g | isophorone diisocyanate |
| 588.0 g | methyl methacrylate |
| 3.0 g | butylated hydroxytoluene (BHT) |

The first ingredient was heated in the flask at 130° C. until all solid material had melted. The material was cooled to 80° C. and the isophorone diisocyanate was added over 30 minutes. The material was held for an additional 45 minutes. The final two ingredients were added under an air blanket. The final product was a hazy liquid with a Gardner-Holdt viscosity of X− and a non-volatile content of 79.2% (measured at 110° C. for one hour).

Example 6

Hydrophobic Blocked Isocyanate Crosslinker

The crosslinker was prepared in a four neck round bottom flask equipped with a thermometer, mechanical stirrer, condenser, dry nitrogen atmosphere, and a heating mantle. The following ingredients were used:

| | |
|---|---|
| 1346.0 g | isocyanurate of hexamethylene diisocyanate |
| 10.4 g | dibutyl tin dilaurate |
| 732.0 g | methylethyl ketoxime |
| 522.0 g | methyl methacrylate |
| 2.1 g | butylated hydroxytoluene (BHT) |

The first two ingredients were stirred in the flask at 22° C. to 60° C. under a nitrogen blanket as the ketoxime was added. After an infrared spectrum indicated the absence of free isocyanate the final two ingredients were added. The final product was a clear liquid with a Gardner-Holdt viscosity of X+ and a non-volatile content of 77.2% (measured at 110° C. for one hour).

Example 7A

Polyester/Acrylic Microparticle Dispersion Containing a Hydrophobic Crosslinker A pre-emulsion was prepared by stirring together the following ingredients:

| | |
|---|---|
| 400.0 g | water |
| 16.7 g | dodecylbenzenesulfonic acid (70% in isopropanol) |
| 7.1 g | IGEPAL CO-897 ethoxylated nonylphenol (89% ethylene oxide) which is commercially available from GAF Corp. |
| 338.0 g | polyester of Example 1 |
| 75.0 g | TACT blocked isocyanate crosslinker, S17762-80(S), which is commercially available from Cytec Industries, Inc. |
| 4.6 g | dimethylethanolamine |
| 30.0 g | hydroxypropyl methacrylate |
| 22.0 g | butyl acrylate |
| 25.0 g | styrene |
| 10.0 g | acrylic acid |
| 2.5 g | mercaptopropionic acid |

The pre-emulsion was passed once through a MICROFLUIDIZER® M110T at 8000 psi and transferred to a four neck round bottom flask equipped with an overhead stirrer, condenser, thermometer, and a nitrogen atmosphere. The polymerization was initiated by adding 1.5 g of isoascorbic acid and 0.01 g of ferrous ammonium sulfate dissolved in 10.0 g water followed by a 30 minute addition of 1.5g of 50% hydrogen peroxide dissolved in 10.0 g of water. The temperature of the reaction increased from 28° C. to 41° C. After 15 minutes an additional 0.75 g of isoascorbic acid in 2.0 g of water was added. The pH was adjusted to 7.0 by the addition of 25.0 g of a 33.3% aqueous solution to dimethylethanolamine. The final product had a nonvolatile content was 48.6%, and the Brookfield viscosity was 39 cps (spindle #1, 50 rpm).

EXAMPLE 7B Comparative

Polyester/Acrylic Microparticle Dispersion
Containing No Hydrophobic Crosslinker A pre-emulsion was prepared by stirring together the following ingredients:

| | |
|---|---|
| 400.0 g | water |
| 16.7 g | dodecylbenzenesulfonic acid (70% in isopropanol) |
| 7.1 g | IGEPAL CO-897 |
| 300.0 g | polyester of Example 1 |
| 100.0 g | styrene |
| 30.0 g | hydroxypropyl methacrylate |
| 60.0 g | butyl acrylate |
| 2.5 g | mercaptopropionic acid |
| 10.0 g | acrylic acid |
| 4.7 g | dimethylethanolamine |

The pre-emulsion was passed once through a MICROFLUIDIZER® M110T at 8000 psi and transferred to a four neck round bottom flask equipped with an overhead stirrer, condenser, thermometer, and a nitrogen atmosphere. 75.0 g of water used to rinse the MICROFLUIDIZER® was added to the flask. The polymerization was initiated by adding 1.5 g of isoascorbic acid and 0.01 g of ferrous ammonium sulfate dissolved in 10.0 g water followed by a one hour addition of 1.5 g of 50% hydrogen hydroperoxide dissolved in 10.0 g of water. After 15 minutes, 0.5 g of isoascorbic acid dissolved in 2.0 g water was added and after an additional 15 minutes 0.5 g of 50% hydrogen hydroperoxide was added. The temperature was reduced to 29° C. and 20.7 g of 33.3% aqueous dimethylethanolamine was added. The final pH of the latex was 7.0, the nonvolatile content was 50.5%, and the Brookfield viscosity was 43 cps (spindle #1, 50 rpm).

Example 8A

Polyurethane Carbamate/Acrylic Microparticle
Dispersion Containing Hydrophobic Crosslinker A pre-emulsion was prepared by stirring together the following ingredients:

| | |
|---|---|
| 800.0 g | water |
| 16.7 g | dodecylbenzenesulfonic acid (70% in isopropanol) |
| 14.2 g | IGEPAL CO-897 |
| 312.5 g | polyurethane of Example 5 |
| 437.5 g | hydrophobic crosslinker of Example 6 |
| 50.0 g | methyl methacrylate |
| 60.0 g | hydroxypropyl methacrylate |
| 120.0 g | butyl acrylate |
| 5.0 g | mercaptopropionic acid |
| 20.0 g | acrylic acid |
| 5.4 g | dimethylethanolamine |

The pre-emulsion was passed once through a MICROFLUIDIZER® M110T at 8000 psi and transferred to a four neck round bottom flask equipped with an overhead stirrer, condenser, thermometer, and a nitrogen atmosphere. 150.0 g of water used to rinse the MICROFLUIDIZER® was added to the flask. The polymerization was initiated by adding 3.0 g of isoascorbic acid and 0.02 g of ferrous ammonium sulfate dissolved in 20.0 g water followed by a one hour addition of 3.0 g of 50% hydrogen hydroperoxide dissolved in 20.0 g of water. The temperature of the reaction increased from 30° C. to 61° C. The temperature was reduced to 26° C. and 30.8 g of 50% aqueous dimethylethanolamine was added. The final pH of the latex was 7.0, the nonvolatile content was 48.9%, and the Brookfield viscosity was 166 cps (spindle #1, 50 rpm).

Example 8B Comparative

Polyurethane Carbamate/Acrylic Microparticle
Dispersion Containing no Hydrophobic Crosslinker A pre-emulsion was prepared by stirring together the following ingredients:

| | |
|---|---|
| 1750.0 g | water |
| 85.7 g | dodecylbenzenesulfonic acid (70% in isopropanol) |
| 28.4 g | IGEPAL CO-897 |
| 1500.0 g | polyurethane carbamate of Example 5 |
| 100.0 g | methyl methacrylate |
| 120.0 g | hydroxypropyl methacrylate |
| 240.0 g | butyl acrylate |
| 10.0 g | mercaptopropionic acid |
| 40.0 g | acrylic acid |
| 16.7 g | dimethylethanolamine |

The pre-emulsion was passed once through a MICROFLUIDIZER® M110T at 8000 psi and transferred to a four neck round bottom flask equipped with an overhead stirrer, condenser, thermometer, and a nitrogen atmosphere. 150.0 g of water used to rinse the MICROFLUIDIZER® was added to the flask. The polymerization was initiated by adding 6.0 g of isoascorbic acid and 0.04 g of ferrous ammonium sulfate dissolved in 40.0 g water followed by a one hour addition of 6.0 g of 50% hydrogen hydroperoxide dissolved in 40.0 g of water. The temperature of the reaction increased from 30° C. to 63° C. The temperature was reduced to 29° C. and 65.7 g of 50% aqueous dimethylethanolamine was added. The final pH of the latex was 7.0, the nonvolatile content was 50.3%, and the Brookfield viscosity was 332 cps (spindle #1, 50 rpm).

Example 9

Polyurethane/Acrylic Microparticle Dispersion

A pre-emulsion was prepared by stirring together the following ingredients:

| | |
|---|---|
| 800.0 g | water |
| 50.0 g | RHODAPEX CO-436 |
| 14.2 g | IGEPAL CO-897 |
| 312.5 g | polyurethane of Example 3 |
| 437.5 g | hydrophobic crosslinker of Example 6 |
| 50.0 g | methyl methacrylate |
| 60.0 g | hydroxypropyl methacrylate |
| 120.0 g | butyl acrylate |
| 5.0 g | mercaptopropionic acid |
| 20.0 g | acrylic acid |

The pre-emulsion was passed once through a MICROFLUIDIZER® M110T at 8000 psi and transferred to a four neck round bottom flask equipped with an overhead stirrer, condenser, thermometer, and a nitrogen atmosphere. 150.0 g of water used to rinse the MICROFLUIDIZER® was added to the flask. The polymerization was initiated by adding 3.0 g of isoascorbic acid and 0.02 g of ferrous ammonium sulfate dissolved in 20.0 g water followed by a one hour addition of 3.0 g of 50% hydrogen hydroperoxide dissolved in 20.0 g of water. The temperature of the reaction increased from 30° C. to 60° C. The temperature was reduced to 29°

C. and 30.9 g of 50% aqueous dimethylethanolamine was added. The final pH of the latex was 7.0, the nonvolatile content was 48.6%, and the Brookfield viscosity was 286 cps (spindle #1, 50 rpm).

Example 10A

Transparent Topcoat Composition With Polyester/ Acrylic Microparticle Dispersion of Example 7A A transparent topcoat film-forming composition was prepared by mixing the following ingredients:

| | |
|---|---|
| 0.59 g | Byk 333 defoamer which is commercially available from Byk-Chemie. |
| 3.15 g | Byk 345 defoamer which is commercially available from Byk-Chemie. |
| 57.9 g | CYMEL ® 385 melamine formaldehyde resin which is commercially available from Cytec Industries, Inc. |
| 625.3 g | polyester/acrylic latex of Example 7A |
| 4.6 g | 50% aqueous dimethylethanolamine |

The first two ingredients were added under agitation to the melamine resin. After mixing for an additional five minutes, the resulting mixture was slowly added to the latex under agitation. The admixture was then stirred for twenty minutes and the pH was adjusted by adding the amine solution dropwise.

The pH of the coating was 8.0 and the % non-volatile content was 55.2%. The viscosity was 33 seconds as measured using a #4 Ford cup.

The transparent topcoat composition of this example was evaluated versus a solventborne two pack isocyanate clearcoat commercially available from BASF Corp. as B+K HVP 15000/SC29-0317 0109 (comparative example). The test substrates were ACT cold roll steel panels 10.2 cm by 30.5 cm (4 inches by 12 inches) electrocoated with a cationic electrodepositable primer commercially available from PPG Industries, Inc. as ED-5000. The panels were primed with a commercially available PPG primer surfacer coded as GPXH5379 and cured for 30 minutes at 325° F. The panels were then coated with a silver basecoat (commercially available from PPG Industries Lacke GmbH as 16-173-9983) which was spray applied (two coats automated spray with 30 seconds ambient flash between coats) at 60% relative humidity and 70° F. The panels were flash baked for 10 minutes at 80° C. then 10 minutes at 150° C. to give a dry film thickness of 12 to 15 micrometers. The transparent topcoat compositions were then spray applied to separate panels (single coat automated spray at 60% relative humidity and 70° F.). The panels were flashed for 15 minutes at room temperature then baked for 15 minutes at 50° C. and for 25 minutes at 140° C. to give dry film thicknesses of 36 micrometers for the topcoat composition of this example and 45–50 micrometers for the comparative example.

The appearance and physical properties of the coated panels were measured using the following tests. Specular gloss was measured at 20° with a Novo Gloss Statistical Glossmeter from Gardco where higher numbers indicate better performance. Distinction of Image (DOI) was measured using Hunter Lab's Dorigon II where higher numbers indicate better performance. The smoothness of the clearcoats was measured using a Byk Wavescan in which results are reported as long wave and short wave numbers where lower values mean smoother films. Reported VOC values were calculated according to the following formula:

$$VOC = \frac{[(1 - \text{percent total solids}) - \text{percent water}] \times \text{lb/gal}}{[1 - ((\text{percent water} \times \text{lb/gal})/8.33)]}$$

The following Table 1 provides the measured properties.

TABLE 1

| | Example 10A | Solventborne 2K Comparative Example |
|---|---|---|
| Gloss of clearcoat at 20° | 88 | 88 |
| DOI of clearcoat | 81 | 91 |
| Byk long wave | 3.9 | 1.4 |
| Byk short wave | 15.9 | 8.2 |
| VOC (calculated) | 0.34 lb/gal | ~4.0 lb/gal |
| % Solvent | <1% | ~45% |

As illustrated by the data presented in Table 1, the coated substrate of the present invention (Example 10A) which is essentially solvent-free exhibited appearance properties similar to those of the commercially available solventborne clearcoat (Comparative Example).

Comparative Example 10B

Clearcoat Composition with Polyester/Acrylic Microparticle Dispersion

A clearcoat composition was prepared by mixing the following ingredients:

| | |
|---|---|
| 19.18 g | CYMEL ® 385 melamine formaldehyde resin which is commercially available from Cytec Industries, Inc. |
| 150.00 g | polyester/acrylic latex of Example 7B |
| 1.16 g | 50% aqueous dimethylethanolamine |

Th melamine resin was slowly added to the microparticle dispersion under agitation. The mixture was then stirred for twenty minutes and the pH was adjusted by adding the amine solution dropwise.

The pH of the coating was 7.99 and the % non-volatile content was 52.5%. The viscosity was 22 seconds as measured using a #4 Ford cup.

The transparent topcoat composition of this example was evaluated versus that of Example 10A. The test substrates were ACT cold roll steel panels 10.2 cm by 30.5 cm (4 inches by 12 inches) electrocoated with a cationic electrodepositable primer commercially available from PPG Industries, Inc. as ED-5051. The clearcoat compositions were then spray applied to separate panels (two coats automated spray at 60% relative humidity and 70° F.). The panels were flashed for 3 minutes at room temperature then baked for 5 minutes at 50° C. and for 30 minutes at 150° C. to give dry film thicknesses of 25 micrometers for the clearcoat composition of this example and 30 micrometers for the comparative example.

The appearance and physical properties of the coated panels were measured using the following tests: Gloss, DOI, and Byk Wavescan were measured as described above. Haze was measured using the Haze Gloss Meter from Byk Gardner where lower numbers indicate better performance. The smoothness of the clearcoats was measured using a Byk Wavescan in which results are reported as long wave and short wave numbers where lower values mean smoother films. The following Table 1A provides the measured properties:

TABLE 1A

|  | Example 10B (COMPARATIVE) | Example 10A |
|---|---|---|
| Gloss of clearcoat at 20° | 89 | 88 |
| Haze | 28 | 13 |
| DOI of clearcoat | 81 | 91 |
| Byk long wave | 11.4 | 2.8 |
| Byk short wave | 15.8 | 14.0 |

The data presented above in Table 1A illustrates that in the coating composition of 10A, the presence in the microparticle of the hydrophobic crosslinking agent of Example 6 according to the present invention provides a coating composition having improved appearance compared to the coating composition of Example 10B. It should be understood that a direct comparison of a formulation containing the dispersion of Example 7B, which contains no hydrophobic crosslinker, in conjunction with the same hydrophobic crosslinking agent of the dispersion of Example 7A (which was incorporated into the microparticle) was not possible. The blocked isocyanate crosslinking agent used in Example 7A is hydrophobic, i.e., insoluble in water and, therefore, could not readily be incorporated by conventional means into the essentially solvent-free topcoat film-forming composition.

Example 11A

Transparent Topcoat Composition with Polyester Carbamate/Acrylic Microparticle Dispersion with Blocked Isocyanate Crosslinker A transparent topcoat composition was prepared by mixing the following ingredients:

| | |
|---|---|
| 0.17 g | Byk 333 |
| 1.00 g | Byk 345 |
| 0.50 g | dibutyl tin dioleate |
| 6.33 g | CYMEL ® 385 |
| 199.39 g | Polyurethane carbamate/acrylic microparticle dispersion with hydrophobic blocked isocyanate crosslinker of Example 8A |
| 0.13 g | 50% aqueous dimethylethanolamine |

The first three ingredients were added under agitation to the melamine resin. After mixing for an additional five minutes, the resulting mixture was slowly added to the latex under agitation. The mixture was then stirred for twenty minutes and the pH was adjusted by adding the amine solution dropwise.

The pH of the coating was 7.0 and the % non-volatile content was 51.1%. The viscosity was 17.5 seconds as measured on a #4 Ford cup.

The clearcoat composition of this example was evaluated against a solventborne two pack isocyanate clearcoat commercially available from BASF Corp. as B+K HVP 15000/SC29-0317 0109 (comparative example). The test substrates were ACT cold roll steel panels 10.2 cm by 30.5 cm (4 inch by 12 inch) electrocoated with a cationic electrodepositable primer commercially available from PPG Industries, Inc. as ED-5000. The panels were primed with a commercially available PPG primer surfacer coded as GPXH5379 and cured for 30 minutes at 325° F. The panels were then coated with a silver basecoat (commercially available from PPG Industries Lacke GmbH as 16-173-9983) which was spray applied (two coats automated spray with 30 seconds ambient flash between coats) at 60% relative humidity and 70° F. The panels were flash baked for 5 minutes at 80° C. to give a dry film thickness of 12 to 15 micrometers. After application of the clearcoat composition panels (single coat automated spray at 60% relative humidity and 70° F.), the panels were flashed at room temperature for 15 minutes then Baked for 5 minutes at 80° C. and for 25 minutes at 150° C. to give a dry film thickness of 36 micrometers for the clearcoat composition of this example and 30–35 micrometers for the comparative example.

The appearance and physical properties of the coated panels were measured using the following tests. Gloss and Byk Wavescan were measured as described in Example 12. Mar resistance was measured using the Atlas AATCC Mar Test Model CM-5 and BON-AMI abrasive cleaner. The clearcoat was abraded and the gloss of the abraded sections measured using the Novo-Gloss Meter. Duplicate results were averaged and compared with the gloss of the original coating. A rating of 0% means complete abrasion of the film and a rating of 100% means no damage. Adhesion was tested as follows: cutting through the coating in a crosshatch pattern with a sharp knife, using a cut interval of 2 millimeters, (six vertical cuts with six horizontal cuts perpendicular to the vertical cuts, resulting in a 10 mm×10 mm grid of 2 mm×2 mm squares), applying tape (#4651 black tape from Beirsdorf) over the cut portion, sharply pulling off the tape at a 600 angle from the coating surface, and estimating the percentage of the transparent topcoating removed with the tape. No loss of adhesion is given a 0% rating and total loss of adhesion is given a 100% rating. Table 2 provides the measured properties:

TABLE 2

|  | Example 11A | Solventborne 2K Comparative Example |
|---|---|---|
| Gloss of clearcoat at 20° | 90 | 90 |
| Byk long wave | 6.4 | 6.2 |
| Byk short wave | 11.1 | 8.1 |
| Adhesion | 0 (no damage) | 0 (no damage) |
| % Gloss retention | 81 | 61 |
| VOC (calculated) | 0.25 lb/gal | ~4.0 lb/gal |
| % Solvent | <1% | ~45% |

As illustrated by the data presented in Table 2 above, the substrate coating of a clear coat containing polymeric microparticles according to the present invention (Example 11A) containing essentially no solvent exhibited appearance similar to the commercially available solventborne clearcoat (Comparative Example).

Example 11B

Clearcoat composition with Polyurethane Carbamate/Acrylic Latex with no Blocked Isocyanate Crosslinker A transparent topcoat composition was prepared by mixing the following ingredients:

| | |
|---|---|
| 0.16 g | Byk 333 |
| 0.94 g | Byk 345 |
| 21.11 g | CYMEL ® 385 |
| 165.65 g | Polyester carbamate/acrylic latex of Example 8B |
| 0.29 g | 50% aqueous dimethylethanolamine |

The first two ingredients were added under agitation to the melamine resin. After mixing for an additional five minutes, the resulting mixture was slowly added to the latex under agitation. The admixture was then stirred for twenty minutes and the pH was adjusted by adding the amine solution dropwise. The pH of the coating was 7.0 and the % non-volatile content was 53.5%. The viscosity was 23.3 seconds as measured on a #4 Ford cup. The transparent topcoat composition of this comparative example was evaluated versus that of Example 11A. The test substrates were ACT cold roll steel panels 10.2 cm by 30.5 cm (4 inch by 12 inch) electrocoated with a cationic electrodepositable primer commercially available from PPG Industries, Inc. as ED-5000. The panels were primed with a commercially available PPG primer surfacer coded as GPXH5379 and cured for 30 minutes at 325° F. The panels were then coated with a silver basecoat (commercially available from PPG Industries Lacke GmbH as 16-173-9983) which was spray applied (two coats automated spray with 30 seconds ambient flash between coats) at 60% relative humidity and 70° F. The panels were flash baked for 5 minutes at 80° C. to give a dry film thickness of 12 to 15 micrometers. After application of the clearcoat composition panels (single coat automated spray at 60% relative humidity and 70° F.), the panels were flashed at room temperature for 15 minutes then baked for 5 minutes at 80° C. and for 25 minutes at 150° C. to give a dry film thickness of 41 micrometers for the clearcoat composition of this example and 36 micrometers for the comparative example.

The appearance and physical properties of the coated panels were measured using the following tests. Gloss and Byk Wavescan were measured as described in Example 10A. Mar resistance and adhesion were measured as described in Example 11A. The following Table 2A provides the measured properties:

TABLE 2A

|  | Example 11B (COMPARATIVE) | Example 11A |
|---|---|---|
| Gloss of clearcoat at 20° | 82 | 90 |
| Byk long wave | 9.6 | 6.4 |
| Byk short wave | 14.4 | 11.1 |
| Adhesion | 0 (no damage) | 0 (no damage) |
| % Gloss retention | 68 | 81 |
| VOC (calculated) | 0.29 lb/gal | 0.25 lb/gal |
| % Solvent | <1% | <1% |

As illustrated by the data presented in Table 2A, the transparent topcoat composition of the present invention (Example 11A), which is comprised of an aqueous dispersion of microparticles containing a hydrophobic crosslinking agent, exhibited appearance and mar resistance properties superior to those containing the analogous microparticles which contain no hydrophobic crosslinking agent. It should be understood that a direct comparison of a coating composition containing the blocked isocyanate crosslinker of Example 6 as an external crosslinking agent versus a coating composition of the present invention (which contains microparticles comprised of the hydrophobic crosslinking agent of Example 6) could not be readily made. The crosslinking agent of Example 6 is hydrophobic, i.e., insoluble in water, and, therefore, cannot readily be incorporated into an essentially solvent-free transparent topcoat composition by conventional means.

Example 12

Transparent Topcoat Composition with Polyurethane/Acrylic Latex Microparticle Dispersion and Blocked Isocyanate Crosslinker A transparent topcoat composition was prepared by mixing the following ingredients:

| | |
|---|---|
| 0.18 g | Byk 333 |
| 1.02 g | Byk 345 |
| 2.53 g | CYMEL ® 385 |
| 0.50 g | dibutyl tin dioleate |
| 200.6 g | polyester/acrylic microparticle dispersion of Example 9 |

The first three ingredients were added under agitation to the melamine resin. After mixing for an additional five minutes, the resulting mixture was slowly added to the latex under agitation. The mixture was then stirred for twenty minutes.

The pH of the coating was 7.0 and the % non-volatile content was 51.7%. The viscosity was 18.5 seconds as measured on a #4 Ford cup.

The clearcoat composition of this example was evaluated over the same substrate (silver basecoat at a dry film thickness of 14 micrometers) described in Example 14. After application of the clearcoat composition panels (single coat automated spray at 60% relative humidity and 70° F.) the panels were flashed for 15 minutes at room temperature then baked for 5 minutes at 80° C. and for 25 minutes at 140° C. to give a dry film thickness of 42 micrometers for the clearcoat composition.

The appearance and physical properties of the coated panels were measured using the test methods described above in previous examples. The following Table 3 provides the measured properties:

TABLE 3

|  | Example 12 | Solventborne 2k Comparative Example |
|---|---|---|
| Gloss of clearcoat at 20° | 94 | 91 |
| Adhesion | 0% loss | 0% loss |
| % Gloss retention (post mar) | 50% | 52% |
| VOC | 0.17 lb/gal | ~4.0 lb/gal |
| % Solvent | <1% | ~45% |

The data presented in Table 3 above illustrate that the substantially solvent-free transparent topcoat film-forming composition of the present invention provides similar appearance, adhesion and mar resistance properties to the commercial solventborne clear coat of the comparative example.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, We claim:

1. A multi-component composite coating composition comprising a base coat deposited from a pigmented film-forming composition and a transparent topcoat composition applied over the base coat in which the transparent topcoat is deposited from a film-forming composition which is substantially free of organic solvent and capable of forming a generally continuous film at ambient temperature, said topcoat film-forming composition comprising:
- at least one thermosettable dispersion comprising polymeric microparticles which are formed in a medium substantially free of organic solvent from the following components:
  - (1) at least one reaction product of polymerizable ethylenically unsaturated monomers;
  - (2) at least one hydrophobic polymer different from (1); and
  - (3) at least one hydrophobic crosslinking agent containing reactive functional groups,
- wherein the reaction product (1) and/or the hydrophobic polymer (2) have functional groups adapted to react with the functional groups of the hydrophobic crosslinking agent (3).

2. The multi-component composite coating composition of claim 1, wherein the polymer (1) contains acid functional groups.

3. The multi-component composite coating composition of claim 2, wherein the polymer (1) comprises the reaction product of the following reactants:
- (A) at least one carboxylic acid functional group-containing ethylenically unsaturated monomer; and
- (B) at least one ethylenically unsaturated monomer which is free of carboxylic acid functional groups.

4. The multi-component composite coating composition of claim 3, wherein the carboxylic acid functional group-containing ethylenically unsaturated monomer (A) is selected from the group consisting of (meth)acrylic acid, acryloxypropionic acid, crotonic acid, fumaric acid, monoalkyl esters of fumaric acid, maleic acid, monoalkylesters of maleic acid, itaconic acid, monoalkyl esters of itaconic acid and mixtures thereof.

5. The multi-component composite coating composition of claim 3, wherein the ethylenically unsaturated monomer (B) which is free of carboxylic acid functional groups is selected from the group consisting of alkyl esters of (meth)acrylic acid, vinyl aromatic monomers, acrylamides, acrylonitriles, dialkyl esters of maleic acid and fumaric acid, vinyl halides, vinyl acetate, vinyl ethers, allyl ethers, allyl alcohols, derivatives thereof and mixtures thereof.

6. The multi-component composite coating composition of claim 5, wherein the ethylenically unsaturated monomer (B) which is free of carboxylic acid functional groups is an alkyl ester of (meth)acrylic acid which comprises a hydroxyalkyl ester of (meth)acrylic acid.

7. The multi-component composite coating composition of claim 5, wherein the ethylenically unsaturated monomer (B) which is free of carboxylic acid functional groups comprises a beta-hydroxy ester functional monomer.

8. The multi-component composite coating composition of claim 1, wherein the polymer (1) is formed by free radical polymerization in the presence of the hydrophobic polymer (2).

9. The multi-component composite coating composition of claim 1, wherein the dispersion comprises internally crosslinked polymeric microparticles.

10. The multi-component composite coating composition of claim 1, wherein the polymer (1) is present in the thermosettable dispersion in an amount ranging from 20 to 60 weight percent based on weight of total resin solids in the dispersion.

11. The multi-component composite coating composition of claim 1 wherein the hydrophobic polymer (2) contains functional groups selected from the group consisting of hydroxyl, carbamate, carboxylic acid, isocyanate and blocked isocyanate, primary amine, secondary amine, amide, urea, urethane, alkoxysilane, vinyl and epoxy groups and mixtures thereof.

12. The multi-component composite coating composition of claim 1, wherein the hydrophobic polymer (2) has an acid value of less than 20 mg KOH/g.

13. The multi-component composite coating composition of claim 1, wherein the hydrophobic polymer (2) is selected from the group consisting of acrylics, polyesters, alkyds, polyurethanes, polyethers, polyureas, polyamides, polycarbonates and mixtures thereof.

14. The multi-component composite coating composition of claim 1, wherein the hydrophobic polymer (2) is at least partially grafted onto the polymer (1).

15. The multi-component composite coating composition of claim 1, wherein the hydrophobic polymer (2) has a number average molecular weight of at least 500.

16. The multi-component composite coating composition of claim 1, wherein the hydrophobic polymer (2) has a number average molecular weight ranging from 800 to 10,000.

17. The multi-component composite coating composition of claim 1, wherein the hydrophobic polymer (2) is present in the thermosettable dispersion in an amount ranging from 20 to 80 weight percent based on weight of total resin solids of the dispersion.

18. The multi-component composite coating composition of claim 1, wherein the hydrophobic crosslinking agent (3) is selected from the group consisting of blocked isocyanates, aminoplast resins and mixtures thereof.

19. The multi-component composite coating composition of claim 1, wherein the hydrophobic crosslinking agent (3) is present in the thermosettable dispersion in an amount ranging from 10 to 60 weight percent based on the weight of total resin solids of the dispersion.

20. The multi-component composite coating composition of claim 1, wherein the resin solids content of the thermosettable dispersion in the film-forming composition is an amount ranging from 30 to 60 weight percent based on weight of total resin solids of the film-forming composition.

21. The multi-component composite coating composition of claim 1, wherein said topcoat film-forming composition further comprises at least one hydrophilic crosslinking agent reactive with the functionality of the microparticles.

22. The multi-component composite coating composition of claim 21, wherein the hydrophilic crosslinking agent is selected from the group consisting of aminoplasts, polyisocyanates, polyacids, polyanhydrides, and mixtures thereof.

23. The multi-component composite coating composition of claim 21, wherein the hydrophilic crosslinking agent is present in the film-forming composition in an amount ranging from 5 to 50 weight percent based on weight of total resin solids of the film-forming composition.

24. The multi-component composite coating composition of claim 1, wherein the solids content of the topcoat film-forming composition ranges from 25 to 70 weight percent.

25. The multi-component composite coating composition of claim 1, wherein the amount of organic solvent present in the topcoat film-forming composition is less than 5.0 weight percent based on total weight of the composition.

26. The multi-component composite coating composition of claim 25, wherein the amount of organic solvent present in the film-forming composition is less than 2.0 weight percent based on total weight of the composition.

27. The multi-component composite coating composition of claim 1, wherein the topcoat film-forming composition further comprises inorganic microparticles selected from the group consisting of fumed silica, amorphous silica, colloidal silica, alumina, colloidal alumina, titanium dioxide, zirconia, colloidal zirconia, and mixtures thereof.

28. A pigmented film-forming composition which is substantially free of organic solvent and capable of forming a generally continuous film at ambient temperature, said pigmented film-forming composition comprising at least one pigment and at least one thermosettable dispersion in a medium substantially free of organic solvent comprising polymeric microparticles which contain (1) at least one polymer formed from polymerizable ethylenically unsaturated monomers; (2) at least one hydrophobic polymer different from (1); and (3) at least one hydrophobic crosslinking agent containing reactive functional groups, wherein the polymer (1) and/or the hydrophobic polymer (2) have functional groups adapted to react with the functional groups of the hydrophobic crosslinking agent (3).

29. The pigmented film-forming composition of claim 28, wherein the polymer (1) contains acid functional groups.

30. The pigmented film-forming composition of claim 28, wherein the hydrophobic polymer (2) has a number average molecular weight of at least 500.

31. A curable composition which is substantially free of organic solvent, said composition comprising:

at least one thermosettable dispersion in a medium substantially free of organic solvent comprising polymeric microparticles which contain (1) at least one polymer formed from polymerizable ethylenically unsaturated monomers; (2) at least one hydrophobic polymer different from (1); and (3) at least one hydrophobic crosslinking agent containing reactive functional groups, wherein the polymer (1) and/or the hydrophobic polymer (2) have functional groups adapted to react with the functional groups of the hydrophobic crosslinking agent (3).

32. The curable composition of claim 31, wherein the polymer (1) contains at least one acid functional group.

33. The curable composition of claim 31, wherein the hydrophobic polymer (2) has a number average molecular weight of greater than 500.

34. The curable composition of claim 31, further comprising at least one hydrophilic crosslinking agent containing functional groups reactive with the functionality of the microparticles.

35. The curable composition of claim 31, wherein said composition is capable of forming a generally continuous film at ambient temperatures.

36. An aqueous dispersion in a medium substantially free of organic solvent comprising polymeric microparticles which contain (1) at least one polymer formed from polymerizable ethylenically unsaturated monomers; (2) at least one hydrophobic polymer different from (1); and (3) at least one hydrophobic crosslinking agent containing reactive functional groups, wherein the polymer (1) and/or the hydrophobic polymer (2) have functional groups adapted to react with the functional groups of the hydrophobic crosslinking agent (3).

37. The dispersion of claim 36, wherein the polymer (1) contains acid functional groups.

38. The dispersion of claim 37, wherein the polymer (1) comprises the reaction product of the following reactants:

(A) at least one carboxylic acid functional group-containing ethylenically unsaturated monomer; and (B) at least one ethylenically unsaturated monomer which is free of carboxylic acid functional groups.

39. The dispersion of claim 38, wherein the carboxylic acid functional group-containing ethylenically unsaturated monomer (A) is selected from the group consisting of (meth)acrylic acid, acryloxypropionic acid, crotonic acid, fumaric acid, monoalkyl esters of fumaric acid, maleic acid, monoalkylesters of maleic acid, itaconic acid, monoalkyl esters of itaconic acid and mixtures thereof.

40. The dispersion of claim 38, wherein the ethylenically unsaturated monomer (B) which is free of carboxylic acid functional groups is selected from the group consisting of alkyl esters of (meth)acrylic acid, vinyl aromatic monomers, acrylamides, acrylonitriles, dialkyl esters of maleic acid and fumaric acid, vinyl halides, vinyl acetate, vinyl ethers, allyl ethers, allyl alcohols, derivatives thereof and mixtures thereof.

41. The dispersion of claim 40, wherein the ethylenically unsaturated monomer (B) which is free of carboxylic acid functional groups comprises a hydroxyalkyl ester of (meth) acrylic acid.

42. The dispersion of claim 40, wherein the ethylenically unsaturated monomer (B) which is free of carboxylic acid functional groups is an alkyl ester of (meth)acrylic acid which comprises a beta-hydroxy ester functional monomer.

43. The dispersion of claim 36, wherein the polymer (1) is formed by free radical polymerization in the presence of the hydrophobic polymer (2) and/or the hydrophobic crosslinker (3).

44. The dispersion of claim 36, wherein the dispersion comprises internally crosslinked polymeric microparticles.

45. The dispersion of claim 36, wherein the polymer (1) is present in an amount ranging from 20 to 60 weight percent based on weight of total resin solids in the dispersion.

46. The dispersion of claim 36, wherein the hydrophobic polymer (2) contains functional groups selected from the group consisting of hydroxyl, carbamate, carboxylic acid, isocyanate and blocked isocyanate, primary amine, secondary amine, amide, urea, urethane, alkoxysilane, vinyl and epoxy groups and mixtures thereof.

47. The dispersion of claim 36, wherein the hydrophobic polymer (2) has an acid value of less than 20 mg KOH/g.

48. The dispersion of claim 36, wherein the hydrophobic polymer (2) is selected from the group consisting of acrylics, polyesters, alkyds, polyurethanes, polyethers, polyureas, polyamides, polycarbonates and mixtures thereof.

49. The dispersion of claim 36, wherein the hydrophobic polymer (2) is at least partially grafted onto the polymer (1).

50. The dispersion of claim 36, wherein the hydrophobic polymer (2) has a number average molecular weight of at least 500.

51. The dispersion of claim 50, wherein the hydrophobic polymer (2) has a number average molecular weight ranging from 800 to 10,000.

52. The dispersion of claim 36, wherein the hydrophobic polymer (2) is present in an amount ranging from 40 to 80 weight percent based on weight of total resin solids of the dispersion.

53. The dispersion of claim 36, wherein the hydrophobic crosslinking agent (3) is selected from the group consisting of blocked isocyanates, aminoplast resins and mixtures thereof.

54. The dispersion of claim 36, wherein the hydrophobic crosslinking agent (3) is present in an amount ranging from 10 to 60 weight percent based on the weight of total resin solids of the dispersion.

55. The dispersion of claim 36, wherein the resin solids content is an amount ranging from 30 to 70 weight percent based on total weight of the dispersion.

56. The dispersion of claim 36 which is capable of forming a generally continuous film at ambient temperature.

57. A method for preparing a thermosettable aqueous dispersion of polymeric microparticles in a medium which is substantially free of organic solvent, said method comprising the following steps:
  (1) mixing together to form an admixture in the substantial absence of organic solvent the following components:
    (a) at least one polymer formed from polymerizable, ethylenically unsaturated monomers;
    (b) at least one hydrophobic polymer different from (a); and
    (c) at least one hydrophobic crosslinking agent having reactive functional groups,
  wherein the polymer (a) and/or the hydrophobic polymer (b) contain functional groups reactive with the functional groups of the hydrophobic crosslinking agent (c); and
  (2) subjecting said admixture to high shear mixing.

58. The method of claim 57, wherein the polymer (a) is the polymerization reaction product of the following reactants:
  (i) at least one carboxylic acid functional group-containing ethylenically unsaturated monomer; and
  (ii) at least one ethylenically unsaturated monomer which is free of carboxylic acid functional groups.

59. The method according to claim 57, wherein the polymer (a) is prepared in the presence of the hydrophobic polymer (b) and/or the hydrophobic crosslinker (c).

60. A substrate coated with the multi-component composite coating composition of claim 1.

61. A substrate coated with the pigmented film-forming composition of claim 28.

* * * * *

UNITED STATES PATENT AND TRADEMARK OFFICE
CERTIFICATE OF CORRECTION

PATENT NO. : 6,329,060 B1  
DATED : December 11, 2001  
INVENTOR(S) : Barkac et al.

It is certified that error appears in the above-identified patent and that said Letters Patent is hereby corrected as shown below:

<u>Column 35,</u>  
Line 3, insert after "dispersion" -- in a medium substantially free of organic solvent --.  
Line 7, delete "reaction product of" and insert -- polymer formed from --.  
Line 13, delete "reaction," and insert -- polymer --.

Signed and Sealed this

Fourth Day of November, 2003

JAMES E. ROGAN  
*Director of the United States Patent and Trademark Office*